United States Patent
Ulrey et al.

(10) Patent No.: US 11,047,322 B2
(45) Date of Patent: Jun. 29, 2021

(54) SPLIT EXHAUST ENGINE WITH IDLE CHECK VALVE

(71) Applicant: Ford Global Technologies, LLC, Dearborn, MI (US)

(72) Inventors: Joseph Ulrey, St. Joseph, MI (US); John Erik Mikael Hellstrom, Ann Arbor, MI (US); Daniel Madison, Dearborn, MI (US); Christopher John Piper, Fenton, MI (US); Andres Ceballos, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 438 days.

(21) Appl. No.: 15/939,005

(22) Filed: Mar. 28, 2018

(65) Prior Publication Data

US 2019/0301383 A1 Oct. 3, 2019

(51) Int. Cl.
| | |
|---|---|
| *F02D 41/00* | (2006.01) |
| *F02D 41/08* | (2006.01) |
| *F02D 13/02* | (2006.01) |
| *F02B 37/18* | (2006.01) |
| *F02D 35/02* | (2006.01) |

(Continued)

(52) U.S. Cl.
CPC ....... *F02D 41/0055* (2013.01); *F01N 13/107* (2013.01); *F02B 37/183* (2013.01); *F02D 13/0257* (2013.01); *F02D 13/0261* (2013.01); *F02D 35/027* (2013.01); *F02D 41/006* (2013.01); *F02D 41/0007* (2013.01); *F02D 41/0052* (2013.01); *F02D 41/0057* (2013.01); *F02D 41/0077* (2013.01);

(Continued)

(58) Field of Classification Search
CPC .............. F02D 41/0007; F02D 41/005; F02D 41/0052; F02D 41/0055; F02D 41/0057; F02D 41/006; F02D 41/0077; F02D 13/0257; F02D 13/0261; F01N 13/107; F02B 37/183; F02M 2026/005; F02M 26/07; F02M 26/38; F02M 26/41; F02M 26/42; F02M 26/44
See application file for complete search history.

(56) References Cited

U.S. PATENT DOCUMENTS

| 4,133,175 A * | 1/1979 | Katoh ..................... F01N 3/34 60/293 |
| 5,714,683 A | 2/1998 | Maloney |

(Continued)

OTHER PUBLICATIONS

Ulrey, J. et al., "Systems and Methods for a Split Exhaust Engine System," U.S. Appl. No. 15/382,477, filed Dec. 16, 2016, 109 pages.

(Continued)

*Primary Examiner* — Jesse S Bogue
*Assistant Examiner* — Loren C Edwards
(74) *Attorney, Agent, or Firm* — Geoffrey Brumbaugh; McCoy Russell LLP

(57) ABSTRACT

Methods and systems are provided for reducing exhaust residuals during light load conditions in a split exhaust engine via a check valve. In one example, a scavenge exhaust manifold may be maintained above a threshold pressure by introducing fresh air into the scavenge manifold during a valve overlap period, the scavenge manifold coupled to a cylinder of an engine and coupled to an intake passage of the engine.

11 Claims, 8 Drawing Sheets

(51) Int. Cl.
*F01N 13/10* (2010.01)
*F02M 26/08* (2016.01)
*F02M 26/00* (2016.01)

(52) U.S. Cl.
CPC ........... *F02D 41/086* (2013.01); *F02M 26/08* (2016.02); *F02M 2026/005* (2016.02)

(56) References Cited

U.S. PATENT DOCUMENTS

2011/0000470 A1* 1/2011 Roth ................... F02D 13/0249
 123/568.11
2011/0132336 A1* 6/2011 Pursifull ................ F02M 26/27
 123/568.11
2011/0168143 A1* 7/2011 VanDerWege ......... F02M 26/06
 123/568.15

OTHER PUBLICATIONS

Ulrey, J. et al., "Systems and Methods for a Split Exhaust Engine System," U.S. Appl. No. 15/382,457, filed Dec. 16, 2016, 109 pages.
Leone, T. et al., "Systems and Methods for a Split Exhaust Engine System," U.S. Appl. No. 15/382,489, filed Dec. 16, 2016, 109 pages.
Ulrey, J. et al., "Systems and Methods for a Split Exhaust Engine System," U.S. Appl. No. 15/382,458, filed Dec. 16, 2016, 112 pages.
Ulrey, J. et al., "Systems and Methods for a Split Exhaust Engine System," U.S. Appl. No. 15/382,484, filed Dec. 16, 2016, 112 pages.
Ulrey, J. et al., "Systems and Methods for a Split Exhaust Engine System," U.S. Appl. No. 15/382,504, filed Dec. 16, 2016, 112 pages.
Ulrey, J. et al., "Systems and Methods for a Split Exhaust Engine System," U.S. Appl. No. 15/382,494, filed Dec. 16, 2016, 109 pages.
Ulrey, J. et al., "Systems and Methods for a Split Exhaust Engine System," U.S. Appl. No. 15/382,500, filed Dec. 16, 2016, 109 pages.
Ulrey, J. et al., "Systems and Methods for a Split Exhaust Engine System," U.S. Appl. No. 15/382,520, filed Dec. 16, 2016, 112 pages.
Boyer, B. et al., "Systems and Methods for a Split Exhaust Engine System," U.S. Appl. No. 15/382,538, filed Dec. 16, 2016, 112 pages.
Ulrey, J. et al., "Systems and Methods for a Split Exhaust Engine System," U.S. Appl. No. 15/382,556, filed Dec. 16, 2016, 112 pages.
Ulrey, J. et al., "Systems and Methods for a Split Exhaust Engine System," U.S. Appl. No. 15/382,549, filed Dec. 16, 2016, 113 pages.
Ulrey, J. et al., "Systems and Methods for a Split Exhaust Engine System," U.S. Appl. No. 15/382,479, filed Dec. 16, 2016, 111 pages.
Ulrey, J. et al., "Systems and Methods for a Split Exhaust Engine System," U.S. Appl. No. 15/382,509, filed Dec. 16, 2016, 109 pages.
Ulrey, J. et al., "Systems and Methods for a Split Exhaust Engine System," U.S. Appl. No. 15/382,532, filed Dec. 16, 2016, 111 pages.
Ulrey, J. et al., "Systems and Methods for a Split Exhaust Engine System," U.S. Appl. No. 15/382,548, filed Dec. 16, 2016, 111 pages.
Ulrey, J. et al., "Systems and Methods for a Split Exhaust Engine System," U.S. Appl. No. 15/382,559, filed Dec. 16, 2016, 112 pages.
Ulrey, J. et al., "Systems and Methods for a Split Exhaust Engine System," U.S. Appl. No. 15/382,485, filed Dec. 16, 2016, 109 pages.
Ulrey, J., "Systems and Methods for a Split Exhaust Engine System," U.S. Appl. No. 15/382,506, filed Dec. 16, 2016, 109 pages.

* cited by examiner

SPLIT EXHAUST ENGINE WITH IDLE CHECK VALVE

FIELD

The present description relates generally to methods and systems for increasing combustion stability and reducing exhaust valve opening losses in a split exhaust engine operating with blowthrough.

BACKGROUND/SUMMARY

Engines may use boosting devices, such as turbochargers, to increase engine power density. However, engine knock may occur due to increased combustion temperatures. Knock is especially problematic under boosted conditions due to high charge temperatures. The inventors herein have recognized that utilizing an engine system with a split exhaust system, where a first exhaust manifold routes exhaust gas recirculation (EGR) to an intake of the engine, upstream of a compressor of the turbocharger, and where a second exhaust manifold routes exhaust to a turbine of the turbocharger in an exhaust of the engine, may decrease knock and increase engine efficiency. In such an engine system, each cylinder may include two intake valves and two exhaust valves, where a first set of cylinder exhaust valves (e.g., blowdown exhaust valves) exclusively coupled to the first exhaust manifold may be operated at a different timing than a second set of cylinder exhaust valves (e.g., scavenge exhaust valves) exclusively coupled to the second exhaust manifold, thereby isolating a blowdown portion and scavenging portion of exhaust gases. The timing of the second set of cylinder exhaust valves may also be coordinated with a timing of cylinder intake valves to create a positive valve overlap period where fresh intake air (or a mixture of fresh intake air and EGR), referred to as blowthrough, may flow through the cylinders and back to the intake, upstream of the compressor, via an EGR passage coupled to the first exhaust manifold. Blowthrough air may remove residual exhaust gases from within the cylinders (referred to as scavenging). The inventors herein have recognized that by flowing a first portion of the exhaust gas (e.g., higher pressure exhaust) through the turbine and a higher pressure exhaust passage and flowing a second portion of the exhaust gas (e.g., lower pressure exhaust) and blowthrough air to the compressor inlet, combustion temperatures can be reduced while improving the turbine's work efficiency and engine torque.

However, the inventors herein have recognized potential issues with such systems. As one example, in the engine system described above, the timing of the two exhaust valve openings results in a relatively long cylinder exhaust event (e.g., the total amount of time an exhaust valve is open), which interacts/overlaps with the intake valve opening. This valve overlap period may negatively impact fuel economy and combustion stability at light engine loads. While the valve overlap period may be reduced or eliminated at low loads by advancing exhaust valve timing, the resultant exhaust valve opening losses may reduce fuel economy, negating any potential benefits of reducing the valve overlap. On the other hand, if the exhaust valve timing is retarded to reduce exhaust valve losses, internal exhaust residuals may be increased, thus decreasing combustion stability. Thus, a mechanism to decrease internal residuals while minimizing exhaust valve losses during low engine loads is desirable to maintain combustion stability and reduce fuel economy.

In one example, the issues described above may be addressed by a method, including maintaining a scavenge exhaust manifold above a threshold pressure by introducing fresh air into the scavenge manifold during a valve overlap period, the scavenge manifold coupled to a cylinder of an engine and coupled to an intake passage of the engine. In this way, the scavenge manifold may be maintained oxygen-rich during idle or other conditions where vacuum may otherwise occur in the scavenge manifold, thus reducing or preventing admission of exhaust gas into the scavenge manifold during the valve overlap period, thereby reducing combustion instability.

In another example, a method includes during low engine load conditions, retarding exhaust valve closing timing for both a blowdown exhaust valve coupling a cylinder of an engine to a turbine and a scavenge exhaust valve coupling the cylinder to an intake of the engine via a scavenge manifold, and reducing exhaust residuals in the cylinder by admitting intake air into the scavenge manifold during a valve overlap period.

In this way, during low engine load conditions such as idle operation, the closing timing for the blowdown exhaust valve and the scavenge exhaust valve may each be retarded, reducing exhaust valve losses associated with earlier closing timings. Because the blowdown valve closes at a later timing (e.g., closer to top dead center), all the exhaust in the cylinder is directed to the turbine via the blowdown valve (which is coupled to a separate blowdown exhaust manifold). This may result in a low pressure condition in the scavenge manifold, that if left unabated, may pull exhaust gas from a subsequent combustion event into the scavenge manifold. Eventually, the scavenge manifold may be filled with exhaust residual, leading to combustion instability. By filling the scavenge manifold with intake air, these exhaust residuals may be reduced, allowing the engine to operate with late exhaust valve closing, thereby reducing exhaust valve losses.

In one example, the intake air may be admitted to the scavenge manifold via a check valve that is positioned between the scavenge manifold and an intake passage upstream of a throttle. For example, the check valve may be positioned in a conduit that is coupled around an exhaust gas recirculation valve and may be configured to only admit air from the intake passage to the scavenge manifold and to block back flow of exhaust gas from the scavenge manifold to the intake during other engine operating conditions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
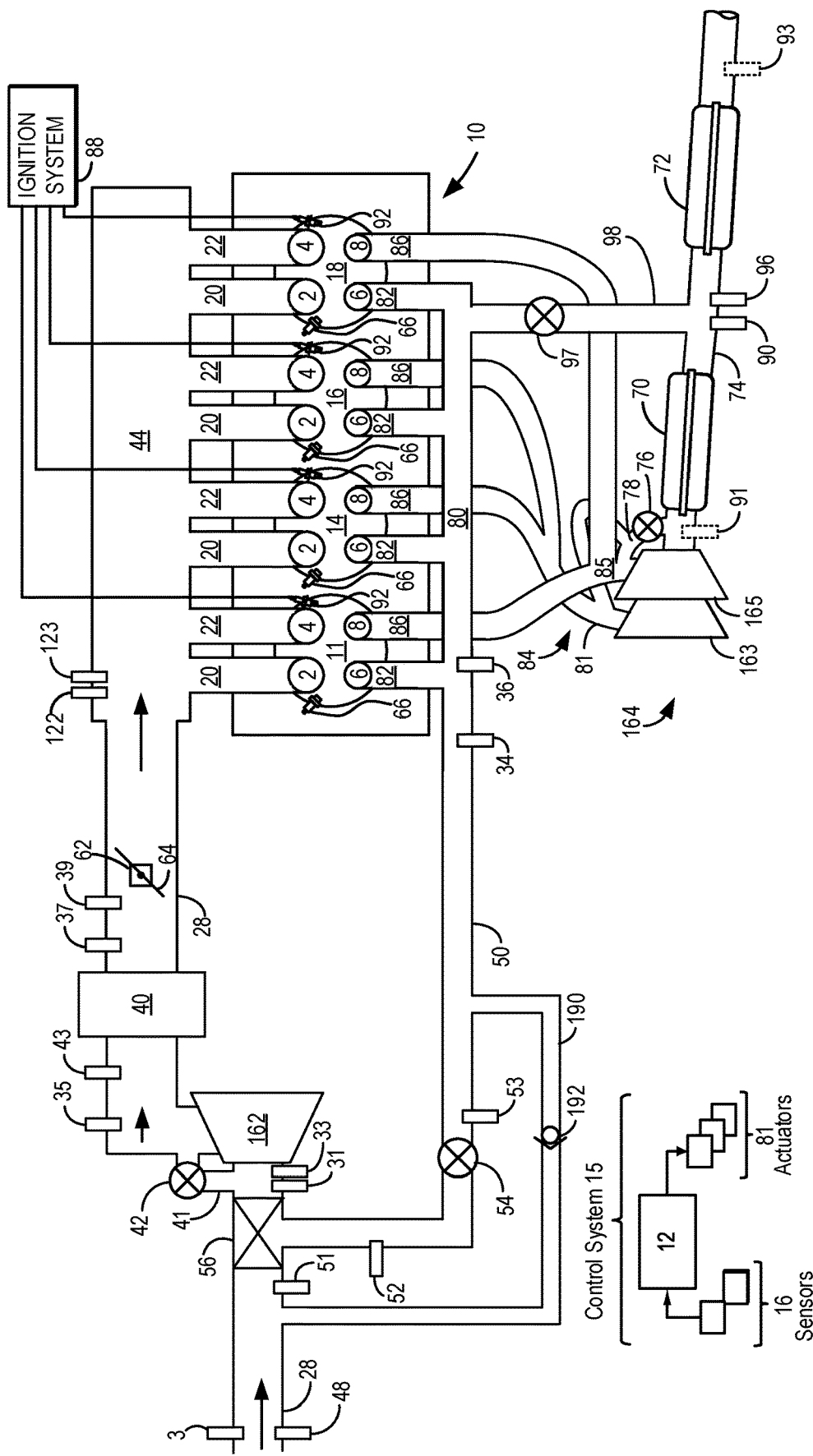
FIGS. 1A and 1B show a schematic depiction of a turbocharged engine system with a split exhaust system.
Figure 1B:
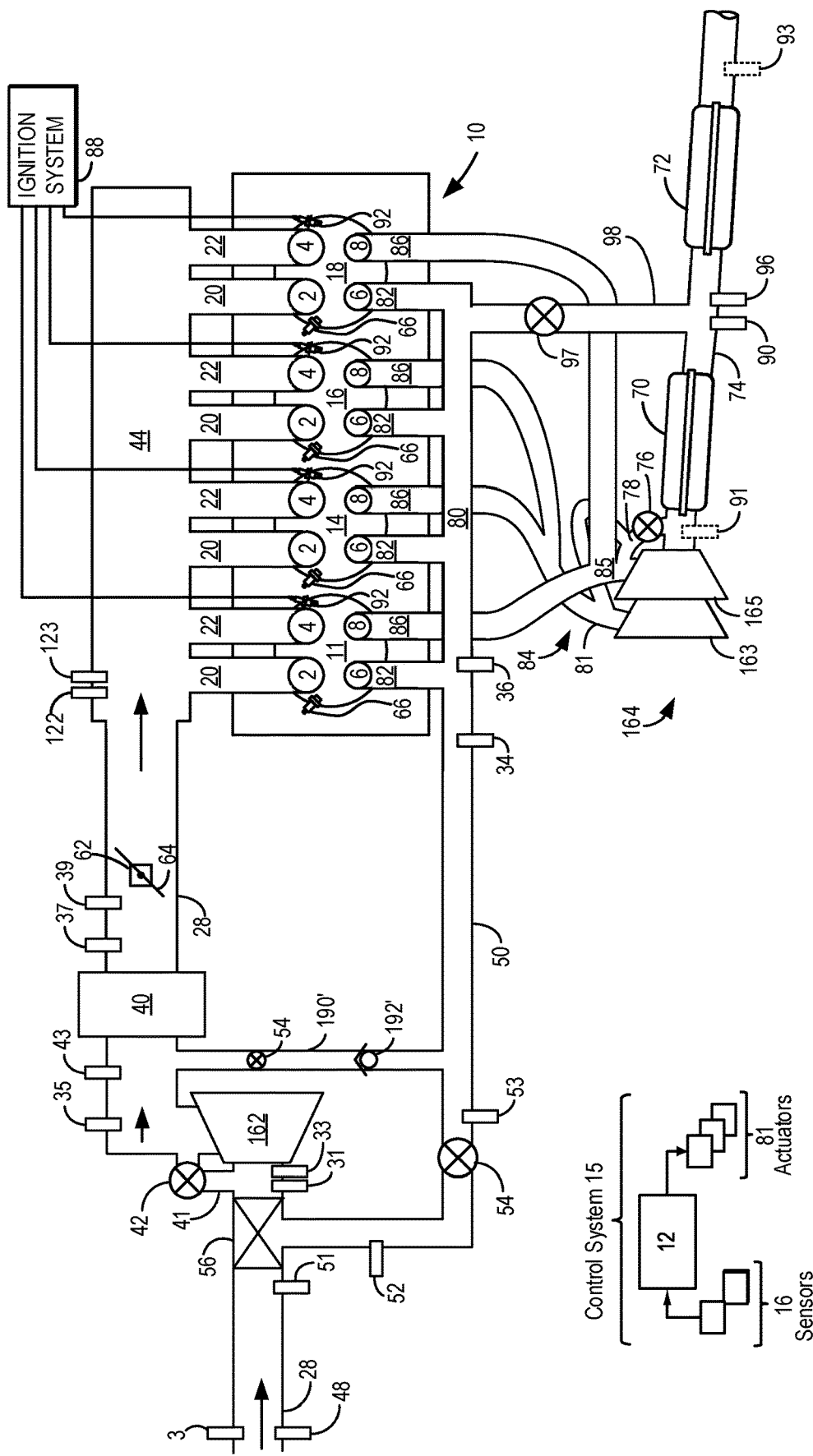
Figure 2:
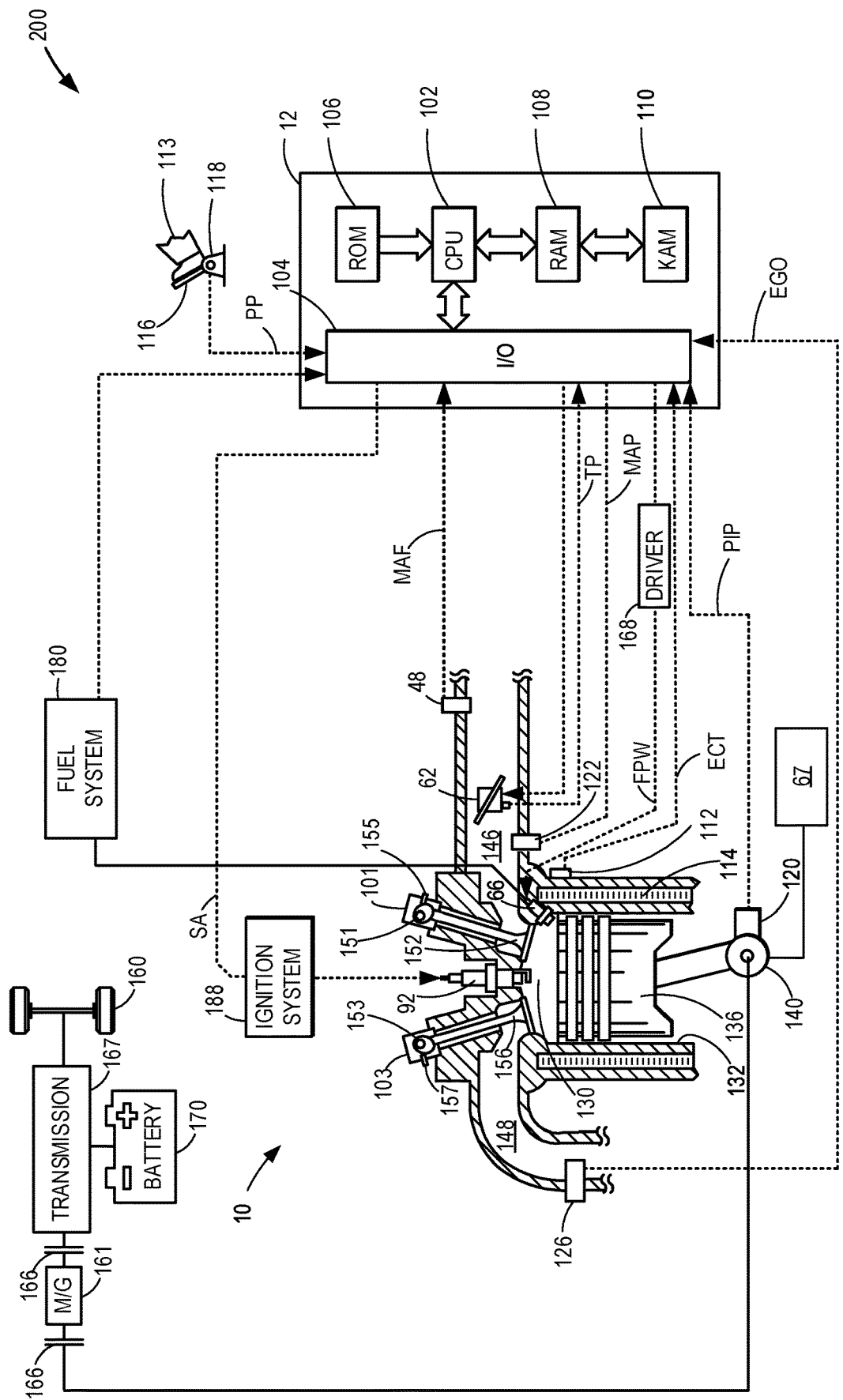
FIG. 2 shows an embodiment of a cylinder of the engine system of FIGS. 1A and 1B.
Figure 3:
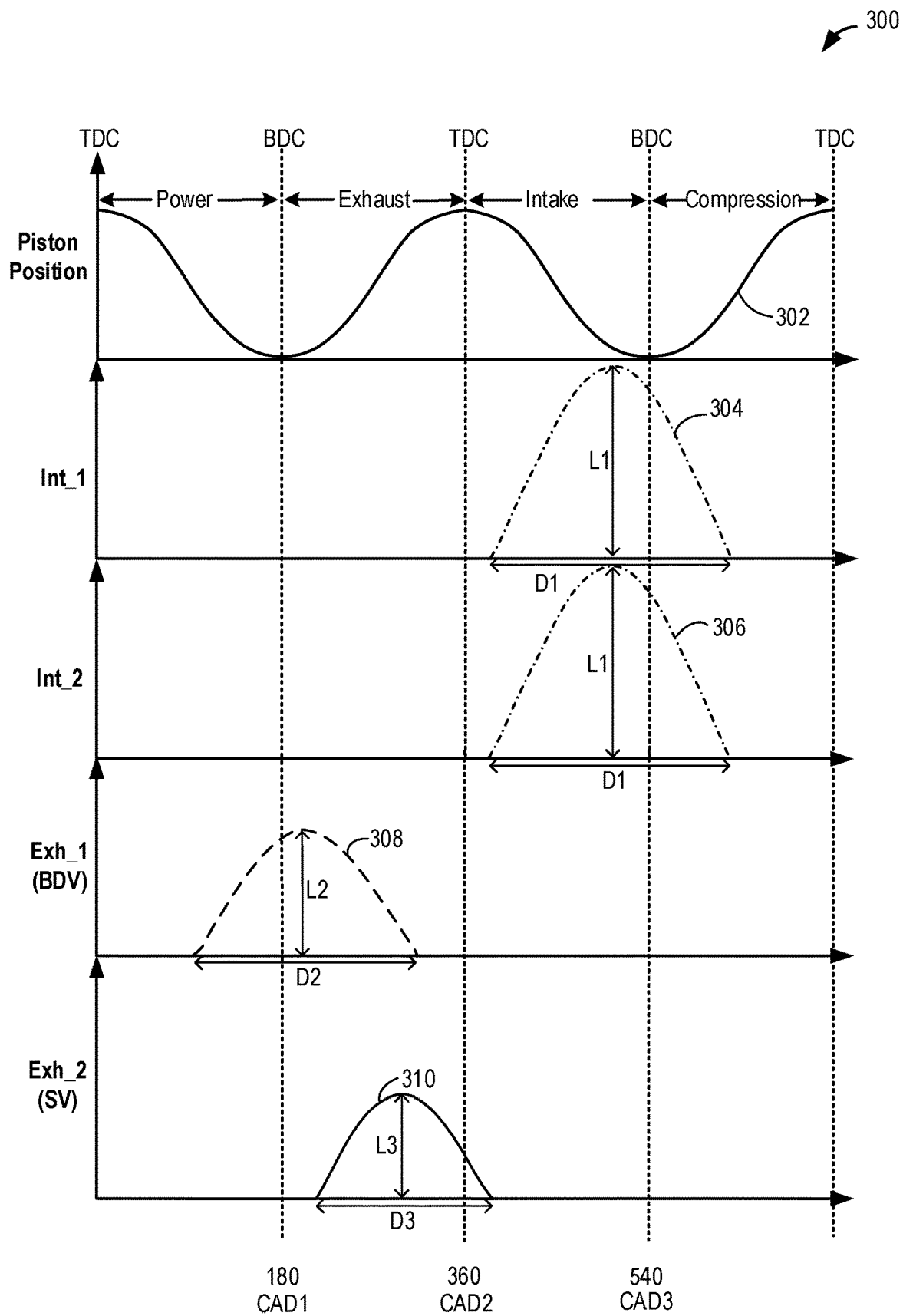
FIG. 3 shows example cylinder intake valve and exhaust valve timings for one engine cylinder of a split exhaust engine system.

The following description relates to systems and methods for operating a split exhaust engine with blowthrough and exhaust gas recirculation (EGR) to an intake via a scavenge exhaust manifold. As shown in FIGS. 1A and 1B, the split exhaust engine includes a first exhaust manifold (referred to herein as a blowdown exhaust manifold) coupled exclusively to a blowdown exhaust valve of each cylinder. The blowdown manifold is coupled to an exhaust passage of the engine, where the exhaust passage includes a turbocharger turbine and one or more emission control devices (which may include one or more catalysts). The split exhaust engine may also include a second exhaust manifold (referred to herein as a scavenge exhaust manifold) coupled exclusively to a scavenge exhaust valve of each cylinder. The scavenge manifold is coupled to the intake passage, upstream of a turbocharger compressor, via an EGR passage including an EGR valve (referred to herein as a scavenge EGR valve). Additionally, in some embodiments, the split exhaust engine system may include various valve actuation mechanisms and may be installed in a hybrid vehicle, as shown in FIG. 2. The scavenge exhaust valves and blowdown exhaust valves open and close at different times in an engine cycle, for each cylinder, in order to isolate scavenge and blowdown portions of combusted exhaust gases and direct these portions separately to the scavenge manifold and blowdown manifold. As shown in FIG. 3, an overlap period may exist between the intake valves and the scavenge exhaust valve of each cylinder where these valves are open at the same time. As a result, fresh, blowthrough air may flow into the EGR passage via the scavenge exhaust valve. Thus, during each engine cycle, the EGR passage may receive a combination of combusted exhaust gases, blowthrough air, and unburnt fuel and recirculate these combined gases to the intake passage.

The specific architecture of the split exhaust engine system (as shown in the example of FIGS. 1A and 1B) and the timings of the cylinder valves which results in an increased proportion of blowthrough air in the gases recirculated to the intake via the EGR passage (compared to a traditional engine with EGR) makes it challenging to maintain combustion stability and reduced fuel economy during low engine loads, such as during idle. For example, fuel economy may be increased by lowering exhaust valve losses that occur when the exhaust valves are closed at a relatively early timing (e.g., before top dead center). The exhaust valve losses may be lowered by retarding exhaust valve closing (e.g., to after top dead center). However, retarding exhaust valve closing may result in a reduced pressure in the scavenge manifold during a valve overlap period where the scavenge exhaust valve and an intake valve are both open. This reduced pressure may result in exhaust gas being admitted to the scavenge manifold. Because both the scavenge EGR valve and scavenge wastegate are closed during idle, the reduced scavenge manifold pressure may lead to accumulation of exhaust residuals in the scavenge manifold that may lower combustion stability.

Figure 4:
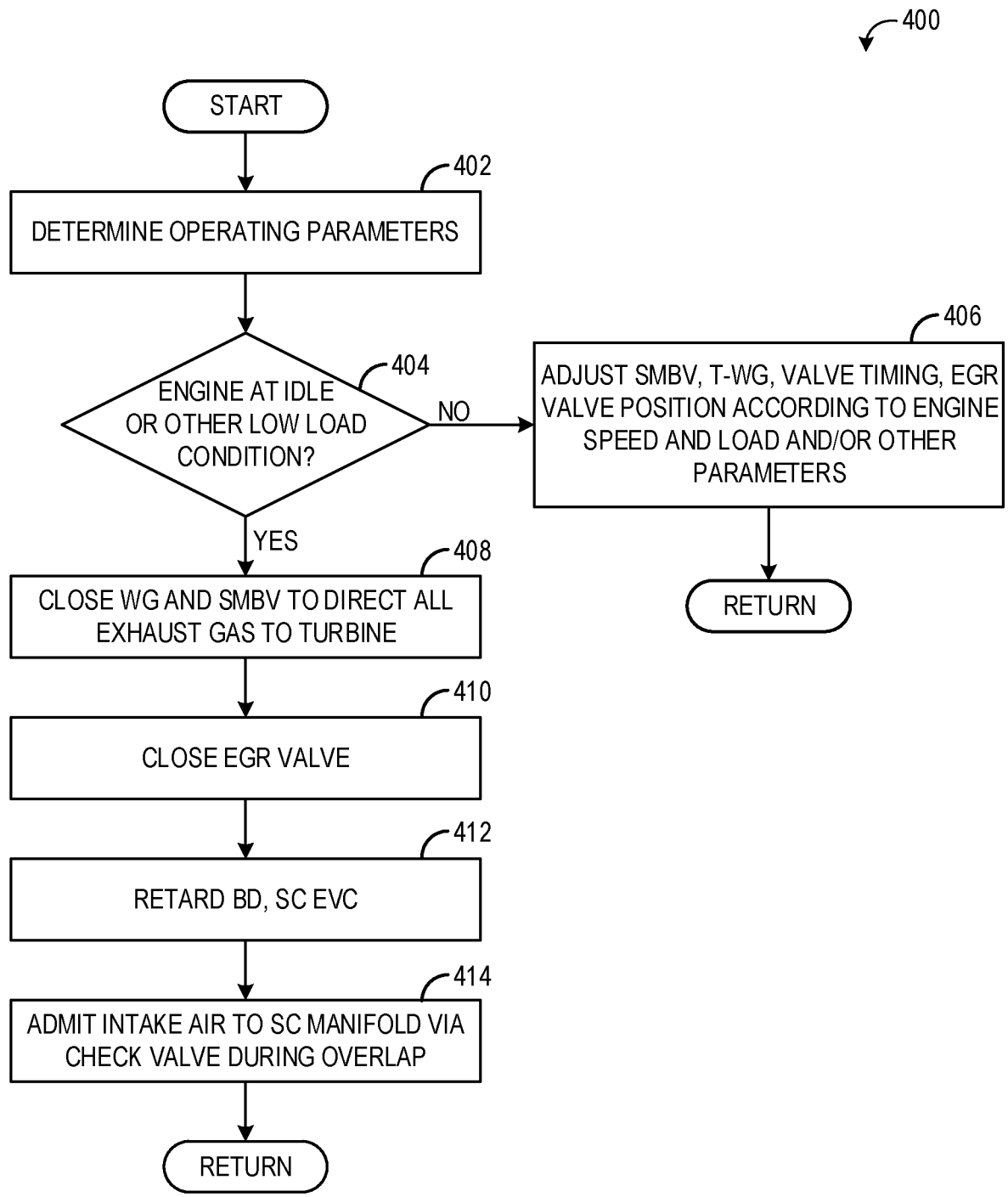
FIG. 4 is a flow chart illustrating an example method for operating a split exhaust engine system.
Figure 5:
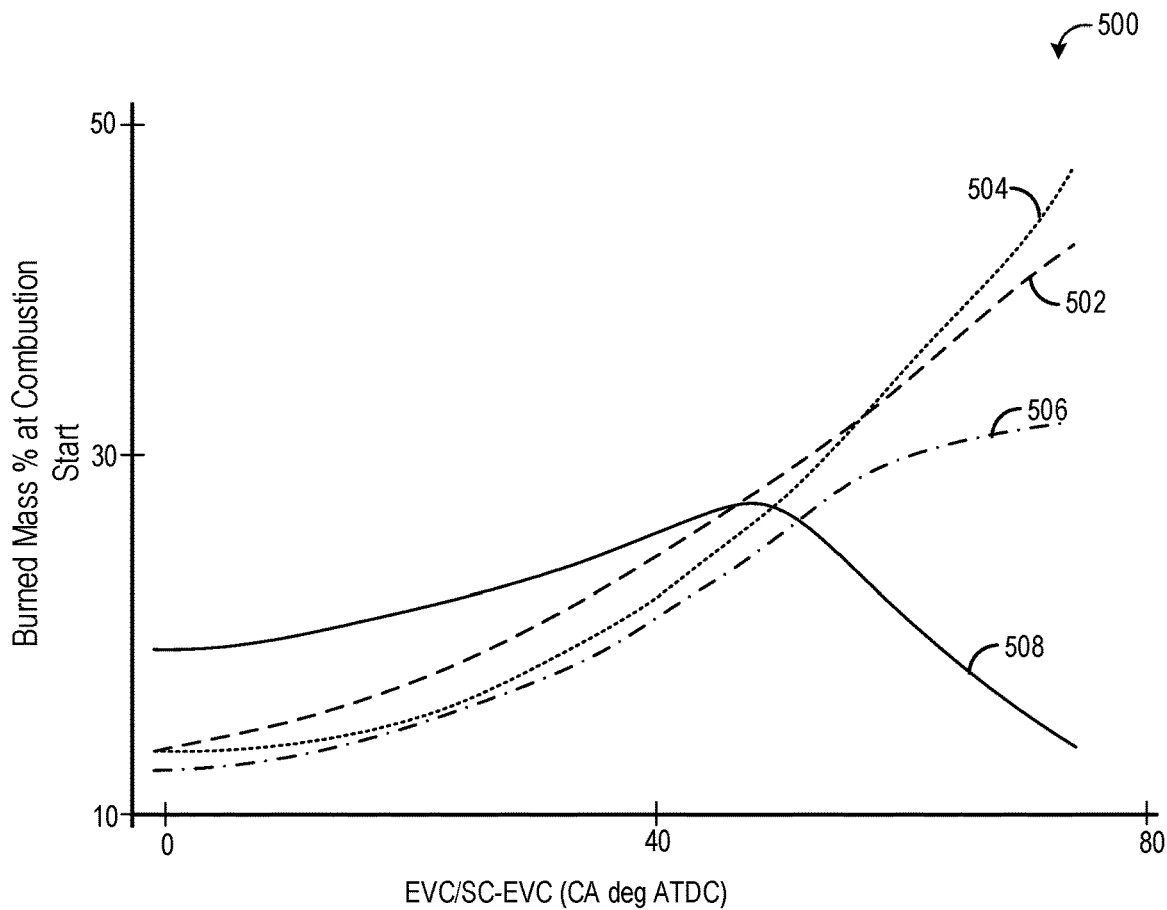
FIG. 5 is an example diagram showing scavenge manifold exhaust residual fractions as a function of exhaust valve closing timing.

Thus, according to embodiments disclosed herein, a check valve may be positioned in parallel with the scavenge EGR valve, as shown in FIGS. 1A and 1B. The check valve may open to introduce fresh air to the scavenge manifold at intake valve opening, as described in flow chart illustrated in FIG. 4, preventing excessive residuals from being stored in the scavenge manifold and improving stability and minimizing exhaust valve opening losses, as shown by the diagrams of FIG. 5 (which illustrates exhaust residuals as a function of exhaust valve closing) and FIG. 6 (which shows example check valve flow rate and manifold pressures as a function of engine position). Example operating parameters that may be observed during execution of the method of FIG. 4 are shown in FIGS. 7A and 7B.

FIG. 1A shows a schematic diagram of a multi-cylinder internal combustion engine 10, which may be included in a propulsion system of an automobile. Engine 10 includes a plurality of combustion chambers (i.e., cylinders) which may be capped on the top by a cylinder head (not shown). In the example shown in FIG. 1A, engine 10 includes cylinders 11, 14, 16, and 18, arranged in an inline-4 configuration. It should be understood, however, that though FIG. 1A shows four cylinders, engine 10 may include any number of cylinders in any configuration, e.g., V-6, I-6, V-12, opposed 4, etc. Further, the cylinders shown in FIG. 1A may have a cylinder configuration, such as the cylinder configuration shown in FIG. 2, as described further below. Each of cylinders 11, 14, 16, and 18 include two intake valves, including first intake valve 2 and second intake valve 4, and two exhaust valves, including first exhaust valve (referred to herein as a blowdown exhaust valve, or blowdown valve) 8 and second exhaust valve (referred to herein as a scavenge exhaust valve, or scavenge valve) 6. The intake valves and exhaust valves may be referred to herein as cylinder intake valves and cylinder exhaust valves, respectively. As explained further below with reference to FIG. 2, a timing (e.g., opening timing, closing timing, opening duration, etc.) of each of the intake valves may be controlled via various camshaft timing systems. In one embodiment, both the first intake valves 2 and second intake valves 4 may be controlled to a same valve timing (e.g., such that they open and close at the same time in the engine cycle). In an alternate embodiment, the first intake valves 2 and second intake valves 4 may be controlled at a different valve timing. Further, the first exhaust valves 8 may be controlled at a different valve timing than the second exhaust valves 6 (e.g., such that a first exhaust valve and second exhaust valve of a same cylinder open at different times than one another and close at different times than one another), as discussed further below.

Each cylinder receives intake air (or a mixture of intake air and recirculated exhaust gas, as explained further below) from an intake manifold 44 via an air intake passage 28. Intake manifold 44 is coupled to the cylinders via intake ports (e.g., runners). For example, intake manifold 44 is shown in FIG. 1A coupled to each first intake valve 2 of each cylinder via first intake ports 20. Further, the intake manifold 44 is coupled to each second intake valve 4 of each cylinder via second intake ports 22. In this way, each cylinder intake port can selectively communicate with the cylinder it is coupled to via a corresponding one of the first intake valves 2 or second intake valves 4. Each intake port may supply air and/or fuel to the cylinder it is coupled to for combustion.

As referred to herein, blowthrough air or blowthrough combustion cooling may refer to intake air that flows from the one or more intake valves of each cylinder to second exhaust valves 6 (and into second exhaust manifold 80)

during a valve opening overlap period between the intake valves and second exhaust valves 6 (e.g., a period when both the intake valves and second exhaust valves 6 are open at the same time), without combusting the blowthrough air.

A high pressure, dual stage, fuel system (such as the fuel system shown in FIG. 2) may be used to generate fuel pressures at injectors 66. As such, fuel may be directly injected in the cylinders via injectors 66. Distributorless ignition system 88 provides an ignition spark to cylinders 11, 14, 16, and 18 via sparks plug 92 in response to controller 12. Cylinders 11, 14, 16, and 18 are each coupled to two exhaust ports for channeling the blowdown and scavenging portions of the combustion gases separately. Specifically, as shown in FIG. 1A, cylinders 11, 14, 16, and 18 exhaust combustion gases (e.g., scavenging portion) to second exhaust manifold (referred to herein as a scavenge manifold) 80 via second exhaust runners (e.g., ports) 82 and combustion gases (e.g., blowdown portion) to first exhaust manifold (referred to herein as a blowdown manifold) 84 via first exhaust runners (e.g., ports) 86. Second exhaust runners 82 extend from cylinders 11, 14, 16, and 18 to second exhaust manifold 80. Additionally, first exhaust manifold 84 includes a first manifold portion 81 and second manifold portion 85. First exhaust runners 86 of cylinders 11 and 18 (referred to herein as the outside cylinders) extend from cylinders 11 and 18 to the second manifold portion 85 of first exhaust manifold 84. Additionally, first exhaust runners 86 of cylinders 14 and 16 (referred to herein as the inside cylinders) extend from cylinders 14 and 16 to the first manifold portion 81 of first exhaust manifold 84.

Each exhaust runner can selectively communicate with the cylinder it is coupled to via an exhaust valve. For example, second exhaust runners 82 communicate with their respective cylinders via second exhaust valves 6 and first exhaust runners 86 communicate with their respective cylinders via first exhaust valves 8. Second exhaust runners 82 are isolated from first exhaust runners 86 when at least one exhaust valve of each cylinder is in a closed position. Exhaust gases may not flow directly between exhaust runners 82 and 86. The exhaust system described above may be referred to herein as a split exhaust manifold system, where a first portion of exhaust gases from each cylinder are output to first exhaust manifold 84 and a second portion of exhaust gases from each cylinder are output to second exhaust manifold 80, and where the first and second exhaust manifolds do not directly communicate with one another (e.g., no passage directly couples the two exhaust manifolds to one another and thus the first and second portions of exhaust gases do not mix with one another within the first and second exhaust manifolds).

Engine 10 includes a turbocharger including a dual-stage exhaust turbine 164 and an intake compressor 162 coupled on a common shaft. Dual-stage turbine 164 includes a first turbine 163 and second turbine 165. First turbine 163 is directly coupled to first manifold portion 81 of first exhaust manifold 84 and receives exhaust gases only from cylinders 14 and 16 via first exhaust valves 8 of cylinders 14 and 16. Second turbine 165 is directly coupled to second manifold portion 85 of first exhaust manifold 84 and receives exhaust gases only from cylinders 11 and 18 via first exhaust valves 8 of cylinders 11 and 18. Rotation of first and second turbines drives rotation of compressor 162 disposed within the intake passage 28. As such, the intake air becomes boosted (e.g., pressurized) at the compressor 162 and travels downstream to intake manifold 44. Exhaust gases exit both first turbine 163 and second turbine 165 into common exhaust passage 74. A wastegate may be coupled across the dual-stage turbine 164. Specifically, wastegate valve 76 may be included in a bypass 78 coupled between each of the first manifold portion 81 and second manifold portion 85, upstream of an inlet to dual-stage turbine 164, and exhaust passage 74, downstream of an outlet of dual-stage turbine 164. In this way, a position of wastegate valve (referred to herein as a turbine wastegate) 76 controls an amount of boost provided by the turbocharger. In alternate embodiments, engine 10 may include a single stage turbine where all exhaust gases from the first exhaust manifold 84 are directed to an inlet of a same turbine.

Exhaust gases exiting dual-stage turbine 164 flow downstream in exhaust passage 74 to a first emission control device 70 and a second emission control device 72, second emission control device 72 arranged downstream in exhaust passage 74 from first emission control device 70. Emission control devices 70 and 72 may include one or more catalyst bricks, in one example. In some examples, emission control devices 70 and 72 may be three-way type catalysts. In other examples, emission control devices 70 and 72 may include one or a plurality of a diesel oxidation catalyst (DOC), and a selective catalytic reduction catalyst (SCR). In yet another example, second emission control device 72 may include a gasoline particulate filter (GPF). In one example, first emission control device 70 may include a catalyst and second emission control device 72 may include a GPF. After passing through emission control devices 70 and 72, exhaust gases may be directed out to a tailpipe.

Exhaust passage 74 further includes a plurality of exhaust sensors in electronic communication with controller 12 of control system 15, as described further below. As shown in FIG. 1A, exhaust passage 74 includes a first oxygen sensor 90 positioned between first emission control device 70 and second emission control device 72. First oxygen sensor 90 may be configured to measure an oxygen content of exhaust gas entering second emission control device 72. Exhaust passage 74 may include one or more additional oxygen sensors positioned along exhaust passage 74, such as second oxygen sensor 91 positioned between dual-stage turbine 164 and first emission control device 70 and/or third oxygen sensor 93 positioned downstream of second emission control device 72. As such, second oxygen sensor 91 may be configured to measure the oxygen content of the exhaust gas entering first emission control device 70 and third oxygen sensor 93 may be configured to measure the oxygen content of exhaust gas exiting second emission control device 72. In one embodiment, the one or more oxygen sensor 90, 91, and 93 may be Universal Exhaust Gas Oxygen (UEGO) sensors. Alternatively, a two-state exhaust gas oxygen sensor may be substituted for oxygen sensors 90, 91, and 93. Exhaust passage 74 may include various other sensors, such as one or more temperature and/or pressure sensors. For example, as shown in FIG. 1A, a pressure sensor 96 is positioned within exhaust passage 74, between first emission control device 70 and second emission control device 72. As such, pressure sensor 96 may be configured to measure the pressure of exhaust gas entering second emission control device 72. Both pressure sensor 96 and oxygen sensor 90 are arranged within exhaust passage 74 at a point where a flow passage 98 couples to exhaust passage 74. Flow passage 98 may be referred to herein as a scavenge manifold bypass passage (SMBP) 98. Scavenge manifold bypass passage 98 is directly coupled to and between second exhaust (e.g., scavenge) manifold 80 and exhaust passage 74. A valve 97 (referred to herein as the scavenge manifold bypass valve, SMBV) is disposed within scavenge manifold bypass passage 98 and is actuatable by controller 12 to adjust an amount of exhaust flow from second exhaust manifold 80 to exhaust passage 74, at a location between first emission control device 70 and second emission control device 72.

Second exhaust manifold 80 is directly coupled to a first exhaust gas recirculation (EGR) passage 50. An EGR passage 50 is a coupled directly between second exhaust manifold 80 and intake passage 28, upstream of compressor (e.g., turbocharger compressor) 162 (and thus may be referred to as a low-pressure EGR passage). As such, exhaust gases (or blowthrough air, as explained further below) is directed from second exhaust manifold 80 to intake passage 28, upstream of compressor 162, via EGR passage 50. EGR passage 50 is shown in FIG. 1A without an EGR cooler but in alternate embodiments, an EGR cooler may be arranged in EGR passage 50 to cool exhaust gases flowing from second exhaust manifold 80 to intake passage 28 and an EGR valve 54 (which may be referred to herein a scavenge EGR valve 54). Controller 12 is configured to actuate and adjust a position of EGR valve 54 in order to control an amount of air flow through EGR passage 50. When EGR valve 54 is in a closed position, no exhaust gases or intake air may flow from second exhaust manifold 80 to intake passage 28, upstream of compressor 162. Further, when EGR valve 54 is in an open position, exhaust gases and/or blowthrough air may flow from second exhaust manifold 80 to intake passage 28, upstream of compressor 162. Controller 12 may additionally adjust EGR valve 54 into a plurality of positions between fully open and fully closed.

An ejector 56 is positioned at an outlet of EGR passage 50, within intake passage 28. Ejector 56 may include a constriction or venturi that provides a pressure increase at the inlet of the compressor 162. As a result, EGR from the EGR passage 50 may be mixed with fresh air flowing through the intake passage 28 to the compressor 162. Thus, EGR from the EGR passage 50 may act as the motive flow on the first ejector 56. In an alternate embodiment, there may not be an ejector positioned at the outlet of EGR passage 50. Instead, an outlet of compressor 162 may be shaped as an ejector that lowers the gas pressure to assist in EGR flow (and thus, in this embodiment, air is the motive flow and EGR is the secondary flow). In yet another embodiment, EGR from EGR passage 50 may be introduced at the trailing edge of a blade of compressor 162, thereby allowing blowthrough air to intake passage 28 via EGR passage 50.

A conduit 190 may take off from the EGR passage 50 downstream of the scavenge manifold. Conduit 190 may fluidly couple EGR passage 50 to intake passage 28 upstream of compressor 162. Conduit 190 may include a one-way check valve 192. In this way, check valve 192 may be positioned in parallel with EGR valve 54. Check valve 192 may be configured to open when a pressure between check valve 192 and intake passage 28 is greater than a pressure between check valve 192 and scavenge manifold 80, thereby admitting gas (e.g., intake air) from intake passage 28 to scavenge manifold 80 during conditions where compressor inlet pressure is greater than scavenge manifold pressure, for example. While conduit 190 is shown in FIG. 1A as being coupled to intake passage 28 upstream of ejector 56, other configurations are possible. For example, conduit 190 may couple to EGR passage 50 on each side of EGR valve 54, may couple to intake passage 28 downstream of ejector 56 and upstream of compressor 162, or other location that is upstream of compressor 162.

Intake passage 28 includes a charge air cooler (CAC) 40. CAC 40 is configured to cool intake air (which may be a mixture of fresh intake air from outside of the engine system and exhaust gases) as it passes through CAC 40. As such, recirculated exhaust gases from first EGR passage 50 may be cooled via CAC 40 before entering intake manifold 44.

Intake passage 28 further includes an electronic intake throttle 62 in communication with intake manifold 44. As shown in FIG. 1A, intake throttle 62 is positioned downstream of CAC 40. The position of a throttle plate 64 of throttle 62 can be adjusted by control system 15 via a throttle actuator (not shown) communicatively coupled to controller 12. By modulating air intake throttle 62, while operating compressor 162, an amount of fresh air may be inducted from the atmosphere and/or an amount of recirculated exhaust gas from the EGR passage into engine 10, cooled by CAC 40 and delivered to the engine cylinders at compressor (or boosted) pressure via intake manifold 44. To reduce compressor surge, at least a portion of the aircharge compressed by compressor 162 may be recirculated to the compressor inlet. A compressor recirculation passage 41 may be provided for recirculating compressed air from the compressor outlet, upstream of CAC 40, to the compressor inlet. Compressor recirculation valve (CRV) 42 may be provided for adjusting an amount of recirculation flow recirculated to the compressor inlet. In one example, CRV 42 may be actuated open via a command from controller 12 in response to actual or expected compressor surge conditions.

Second exhaust manifold 80 and/or second exhaust runners 82 may include one or more sensors (such as pressure, oxygen, and/or temperature sensors) disposed therein. For example, as shown in FIG. 1A, second exhaust manifold 80 includes pressure sensors 34 and 53, temperature sensor 52, and oxygen sensor 36, disposed therein and configured to measure a pressure, a temperature, and an oxygen content, respectively, of exhaust gases and blowthrough (e.g., intake) air, exiting second exhaust valves 6 and entering second exhaust manifold 80. Additionally or alternatively to oxygen sensor 36, each second exhaust runner 82 may include an individual oxygen sensor disposed therein. As such, an oxygen content of exhaust gases and/or blowthrough air exiting each cylinder via second exhaust valves 6 may be determined based on an output of one or more oxygen sensors.

Intake passage 28 may include one or more additional sensors (such as additional pressure, temperature, flow rate, and/or oxygen sensors). For example, as shown in FIG. 1A, intake passage 28 includes a mass air flow (MAF) sensor 48 and a first intake temperature sensor 3, disposed upstream of compressor 162, where EGR passage 50 couples to intake passage 28. A first intake pressure sensor 51 may be arranged immediately upstream of the venturi of ejector 56. A second intake pressure sensor 31 and a second intake temperature sensor 33 are positioned in intake passage 28, upstream of compressor 162 and downstream of where EGR passage 50 couples to intake passage 28. An intake oxygen sensor 35 and an intake temperature sensor 43 may be located in intake passage 28, downstream of compressor 162 and upstream of CAC 40. An additional intake pressure sensor 37 may be positioned in intake passage 28, downstream of CAC 40 and upstream of throttle 62. In some embodiments, as shown in FIG. 1A, an additional intake oxygen sensor 39 may be positioned in intake passage 28, between CAC 40 and throttle 62. Further, an intake manifold pressure (e.g., MAP) sensor 122 and intake manifold temperature sensor 123 are positioned within intake manifold 44, upstream of all engine cylinders.

In some examples, engine 10 may be coupled to an electric motor/battery system (as shown in FIG. 2) in a hybrid vehicle. The hybrid vehicle may have a parallel configuration, series configuration, or variation or combinations thereof. Further, in some embodiments, other engine configurations may be employed, for example a diesel engine.

Engine 10 may be controlled at least partially by a control system 15 including controller 12 and by input from a vehicle operator via an input device (not shown in FIG. 1A). Control system 15 is shown receiving information from a plurality of sensors 16 (various examples of which are described herein) and sending control signals to a plurality of actuators 83. As one example, sensors 16 may include pressure, temperature, and oxygen sensors located within the intake passage 28, intake manifold 44, exhaust passage 74, and second exhaust manifold 80, as described above. Other sensors may include a throttle inlet pressure (TIP) sensor for estimating a throttle inlet pressure (TIP) and/or a throttle inlet temperature sensor for estimating a throttle air temperature (TCT) coupled downstream of the throttle in the intake passage. Additional system sensors and actuators are elaborated below with reference to FIG. 2. As another example, actuators 83 may include fuel injectors, valves 63, 42, 54, 97, 76, and throttle 62. Actuators 83 may further include various camshaft timing actuators coupled to the cylinder intake and exhaust valves (as described further below with reference to FIG. 2). Controller 12 may receive input data from the various sensors, process the input data, and trigger the actuators in response to the processed input data based on instruction or code programmed in a memory of controller 12 corresponding to one or more routines. Example control routines (e.g., methods) are described herein at FIG. 4. For example, adjusting EGR flow from second exhaust manifold 80 to intake passage 28 may include adjusting an actuator of EGR valve 54 to adjust an amount of exhaust flow flowing to intake passage 28, upstream of compressor 162, from second exhaust manifold 80. In another example, adjusting EGR flow from second exhaust manifold 80 to intake passage 28 may include adjusting an actuator of an exhaust valve camshaft to adjust an opening timing of second exhaust valves 6.

In this way, the first and second exhaust manifolds of FIG. 1A may be configured to separately channel the blowdown and scavenging portions of the exhaust. First exhaust manifold 84 may channel the blowdown pulse of the exhaust to dual-stage turbine 164 via first manifold portion 81 and second manifold portion 85 while second exhaust manifold 80 may channel the scavenging portion of exhaust to intake passage 28 via EGR passage 50 and/or to exhaust passage 74, downstream of the dual-stage turbine 164, via flow passage 98. For example, first exhaust valves 8 channel the blowdown portion of the exhaust gases through first exhaust manifold 84 to the dual-stage turbine 164 and both first and second emission control device 70 and 72 while second exhaust valves 6 channel the scavenging portion of exhaust gases through second exhaust manifold 80 and to either intake passage 28 via the EGR passage or exhaust passage 74 and second emission control device 72 via flow passage 98.

FIG. 1B shows an alternate embodiment of engine 10 where the conduit housing the check valve couples to the intake system downstream of compressor 162. Similar components to those illustrated in FIG. 1A are given like reference numbers and further description of those components is dispensed with. The description of the components of FIG. 1A not otherwise described with respect to FIG. 1B applies to the components of FIG. 1B.

Conduit 190' is shown fluidly coupling EGR passage 50 to intake passage 28 downstream of compressor 162 and upstream of CAC 40. However, other locations for the coupling between conduit 190' and intake passage 28 are possible, such as downstream of CAC 40. Conduit 190' includes a check valve 192' that is configured to open when pressure between compressor 162 and check valve 192' is greater than pressure between check valve 192' and scavenge manifold 80, thereby admitting gas (e.g., intake air) from intake passage 28 to scavenge manifold 80 during conditions where compressor outlet pressure is greater than scavenge manifold pressure, for example. To prevent admission of compressed intake air to scavenge manifold 80 during non-idle conditions or other conditions where the admission of such compressed air would not be desirable, conduit 190' may include a blocking valve 54. Blocking valve 54 may be controlled by controller 12 to open during some conditions, such as idle or other low load conditions, when admission of intake air to scavenge manifold 80 is desired.

Referring now to FIG. 2, it depicts a partial view of a single cylinder of internal combustion engine 10 which may be installed in a vehicle 100. As such, components previously introduced in FIG. 1A and/or 1B are represented with the same reference numbers and are not re-introduced. Engine 10 is depicted with combustion chamber (cylinder) 130, coolant sleeve 114, and cylinder walls 132 with piston 136 positioned therein and connected to crankshaft 140. Combustion chamber 130 is shown communicating with intake passage 146 and exhaust passage 148 via respective intake valve 152 and exhaust valve 156. As previously described in FIG. 1A, each cylinder of engine 10 may exhaust combustion products along two conduits. In the depicted view, exhaust passage 148 represents the first exhaust runner (e.g., port) leading from the cylinder to the turbine (such as first exhaust runner 86 of FIG. 1A) while the second exhaust runner is not visible in this view.

As also previously elaborated in FIG. 1A, each cylinder of engine 10 may include two intake valves and two exhaust valves. In the depicted view, intake valve 152 and exhaust valve 156 are located at an upper region of combustion chamber 130. Intake valve 152 and exhaust valve 156 may be controlled by controller 12 using respective cam actuation systems including one or more cams. The cam actuation systems may utilize one or more of cam profile switching (CPS), variable cam timing (VCT), variable valve timing (VVT), and/or variable valve lift (VVL) systems to vary valve operation. In the depicted example, each intake valve 152 is controlled by an intake cam 151 and each exhaust valve 156 is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. For example, the controller may send a signal to the exhaust valve timing actuator 103 to deactivate the exhaust valve 156 such that it remains closed and does not open at its set timing. The position of intake valve 152 and exhaust valve 156 may be determined by valve position sensors 155 and 157, respectively. As introduced above, in one example, all exhaust valves of every cylinder may be controlled on a same exhaust camshaft. As such, both a timing of the scavenge (second) exhaust valves and the blowdown (first) exhaust valves may be adjusted together via one camshaft, but they may each have different timings relative to one another. In another example, the scavenge exhaust valve of every cylinder may be controlled on a first exhaust camshaft and a blowdown exhaust valve of every cylinder may be controlled on a different, second exhaust camshaft. In this way, the valve timing of the scavenge valves and blowdown valves may be adjusted separately from one another. In alternate embodiments, the cam or valve timing system(s) of the scavenge and/or blowdown exhaust valves may employ a cam in cam system, an electro-hydraulic type system on the scavenge valves, and/or an electro-mechanical valve lift control on the scavenge valves.

For example, in some embodiments, the intake and/or exhaust valve may be controlled by electric valve actuation. For example, cylinder 130 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

In one example, intake cam 151 includes separate and different cam lobes that provide different valve profiles (e.g., valve timing, valve lift, duration, etc.) for each of the two intake valves of combustion chamber 130. Likewise, exhaust cam 153 may include separate and different cam lobes that provide different valve profiles (e.g., valve timing, valve lift, duration, etc.) for each of the two exhaust valves of combustion chamber 130. In another example, intake cam 151 may include a common lobe, or similar lobes, that provide a substantially similar valve profile for each of the two intake valves.

In addition, different cam profiles for the different exhaust valves can be used to separate exhaust gases exhausted at low cylinder pressure from exhaust gases exhausted at exhaust pressure. For example, a first exhaust cam profile can open from closed position the first exhaust valve (e.g., blowdown valve) just before BDC (bottom dead center) of the power stroke of combustion chamber 130 and close the same exhaust valve well before top dead center (TDC) to selectively exhaust blowdown gases from the combustion chamber. Further, a second exhaust cam profile can be positioned to open from close a second exhaust valve (e.g., scavenge valve) before a mid-point of the exhaust stroke and close it after TDC to selectively exhaust the scavenging portion of the exhaust gases.

Thus, the timing of the first exhaust valve and the second exhaust valve can isolate cylinder blowdown gases from scavenging portion of exhaust gases while any residual exhaust gases in the clearance volume of the cylinder can be cleaned out with fresh intake air blowthrough during positive valve overlap between the intake valve and the scavenge exhaust valves. By flowing a first portion of the exhaust gas leaving the cylinders (e.g., higher pressure exhaust) to the turbine(s) and a higher pressure exhaust passage and flowing a later, second portion of the exhaust gas (e.g., lower pressure exhaust) and blowthrough air to the compressor inlet, the engine system efficiency is improved. Turbine energy recovery may be enhanced and engine efficiency may be improved via increased EGR and reduced knock.

Continuing with FIG. 2, exhaust gas sensor 126 is shown coupled to exhaust passage 148. Sensor 126 may be positioned in the exhaust passage upstream of one or more emission control devices, such as devices 70 and 72 of FIG. 1A. Sensor 126 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. The downstream emission control devices may include one or more of a three way catalyst (TWC), NOx trap, GPF, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc.

Cylinder 130 can have a compression ratio, which is the ratio of volumes when piston 136 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 92 for initiating combustion. Ignition system 188 can provide an ignition spark to combustion chamber 130 via spark plug 92 in response to spark advance signal SA from controller 12, under select operating modes. However, in some embodiments, spark plug 92 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 130 is shown including one fuel injector 66. Fuel injector 66 is shown coupled directly to combustion chamber 130 for injecting fuel directly therein in proportion to the pulse width of signal FPW received from controller 12 via electronic driver 168. In this manner, fuel injector 66 provides what is known as direct injection (hereafter also referred to as "DI") of fuel into combustion cylinder 130. While FIG. 2 shows injector 66 as a side injector, it may also be located overhead of the piston, such as near the position of spark plug 92. Such a position may improve mixing and combustion when operating the engine with an alcohol-based fuel due to the lower volatility of some alcohol-based fuels. Alternatively, the injector may be located overhead and near the intake valve to improve mixing. In an alternate embodiment, injector 66 may be a port injector providing fuel into the intake port upstream of cylinder 130.

Fuel may be delivered to fuel injector 66 from a high pressure fuel system 180 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. Fuel tanks in fuel system 180 may hold fuel with different fuel qualities, such as different fuel compositions. These differences may include different alcohol content, different octane, different heat of vaporizations, different fuel blends, and/or combinations thereof etc. In some embodiments, fuel system 180 may be coupled to a fuel vapor recovery system including a canister for storing refueling and diurnal fuel vapors. The fuel vapors may be purged from the canister to the engine cylinders during engine operation when purge conditions are met. For example, the purge vapors may be naturally aspirated into the cylinder via the first intake passage at or below barometric pressure.

Engine 10 may be controlled at least partially by controller 12 and by input from a vehicle operator 113 via an input device 118 such as an accelerator pedal 116. The input device 118 sends a pedal position signal to controller 12. Controller 12 is shown in FIG. 2 as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described below as well as other variants that are anticipated but not specifically listed. Controller 12 may receive various signals from sensors coupled to engine 10, in addition to those signals previously discussed, including measurement of inducted mass air flow (MAF) from mass air flow sensor 48; engine coolant temperature (ECT) from temperature sensor 112 coupled to coolant sleeve 114; a profile ignition pickup signal (PIP) from Hall effect sensor 120 (or other type) coupled to crankshaft 140; throttle position (TP) from a throttle position sensor; absolute manifold pressure signal (MAP) from sensor 122, cylinder AFR from EGO sensor 126, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Based on input from one or more of the above-mentioned sensors, controller 12 may adjust one or more actuators, such as fuel injector 66, throttle 62, spark plug 92, intake/exhaust valves and cams, etc. The controller may receive input data from the various sensors, process the input data, and trigger the actuators in response to the processed input data based on instruction or code programmed therein corresponding to one or more routines.

In some examples, vehicle 100 may be a hybrid vehicle with multiple sources of torque available to one or more vehicle wheels 160. In other examples, vehicle 100 is a conventional vehicle with only an engine, or an electric vehicle with only electric machine(s). In the example shown in FIG. 2, vehicle 100 includes engine 10 and an electric machine 161. Electric machine 161 may be a motor or a motor/generator and thus may also be referred to herein as an electric motor. Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

Electric machine 161 receives electrical power from a traction battery 170 to provide torque to vehicle wheels 160. Electric machine 161 may also be operated as a generator to provide electrical power to charge battery 170, for example during a braking operation.

FIGS. 1A-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact.+As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Now turning to FIG. 3, graph 300 depicts example valve timings with respect to a piston position, for an engine cylinder comprising 4 valves: two intake valves and two exhaust valves, such as described above with reference to FIGS. 1A-2. The example of FIG. 3 is drawn substantially to scale, even though each and every point is not labeled with numerical values. As such, relative differences in timings can be estimated by the drawing dimensions. However, other relative timings may be used, if desired.

Continuing with FIG. 3, the cylinder is configured to receive intake via two intake valves and exhaust a first blowdown portion to a turbine inlet via a first exhaust valve (e.g., such as first, or blowdown, exhaust valves 8 shown in FIG. 1A), exhaust a second scavenging portion to an intake passage via a second exhaust valve (e.g., such as second, or scavenge, exhaust valves 6 shown in FIG. 1A) and non-combusted blowthrough air to the intake passage via the second exhaust valve. By adjusting the timing of the opening and/or closing of the second exhaust valve with that of the two intake valves, residual exhaust gases in the cylinder clearance volume may be cleaned out and recirculated as EGR along with fresh intake blowthrough air.

Graph 300 illustrates an engine position along the x-axis in crank angle degrees (CAD). Curve 302 depicts piston positions (along the y-axis), with reference to their location from top dead center (TDC) and/or bottom dead center (BDC), and further with reference to their location within the four strokes (intake, compression, power and exhaust) of an engine cycle.

During engine operation, each cylinder typically undergoes a four stroke cycle including an intake stroke, compression stroke, expansion stroke, and exhaust stroke. During the intake stroke, generally, the exhaust valves close and intake valves open. Air is introduced into the cylinder via the corresponding intake passage, and the cylinder piston moves to the bottom of the cylinder so as to increase the volume within the cylinder. The position at which the piston is near the bottom of the cylinder and at the end of its stroke (e.g. when the combustion chamber is at its largest volume) is typically referred to by those of skill in the art as bottom dead center (BDC). During the compression stroke, the intake valves and exhaust valves are closed. The piston moves toward the cylinder head so as to compress the air within combustion chamber. The point at which the piston is at the end of its stroke and closest to the cylinder head (e.g. when the combustion chamber is at its smallest volume) is typically referred to by those of skill in the art as top dead center (TDC). In a process herein referred to as injection, fuel is introduced into the combustion chamber. In a process herein referred to as ignition, the injected fuel is ignited by known ignition means, such as a spark plug, resulting in combustion. During the expansion stroke, the expanding gases push the piston back to BDC. A crankshaft converts this piston movement into a rotational torque of the rotary shaft. During the exhaust stroke, in a traditional design, exhaust valves are opened to release the residual combusted air-fuel mixture to the corresponding exhaust passages and the piston returns to TDC. In this description, the second exhaust (scavenge) valves may be opened after the beginning of the exhaust stroke and stay open until after the end of the exhaust stroke while the first exhaust (blowdown) valves are closed and the intake valves are opened to flush out residual exhaust gases with blowthrough air.

Curve 304 depicts a first intake valve timing, lift, and duration for a first intake valve (Int_1) while curve 306 depicts a second intake valve timing, lift, and duration for a second intake valve (Int_2) coupled to the intake passage of the engine cylinder. Curve 308 depicts an example exhaust valve timing, lift, and duration for a first exhaust valve (Exh_1, which may correspond to first, or blowdown, exhaust valves 8 shown in FIG. 1A) coupled to a first exhaust manifold (e.g., blowdown exhaust manifold 84 shown in FIG. 1A) of the engine cylinder, while curve 310 depicts an example exhaust valve timing, lift, and duration for a second exhaust valve (Exh_2, which may correspond to second, or scavenge, exhaust valves 6 shown in FIG. 1A) coupled to a second exhaust manifold (e.g., scavenge manifold 80 shown in FIG. 1A) of the engine cylinder. As previously elaborated, the first exhaust manifold connects a first exhaust valve to the inlet of a turbine in a turbocharger and the second exhaust manifold connects a second exhaust valve to an intake passage via an EGR passage. The first and second exhaust manifolds may be separate from each other, as explained above.

In the depicted example, the first and second intake valves are fully opened from a closed position at a common timing (curves 304 and 306), starting close to intake stroke TDC, just after CAD2 (e.g., at or just after intake stroke TDC) and are closed after a subsequent compression stroke has commenced past CAD3 (e.g., after BDC). Additionally, when opened fully, the two intake valves may be opened with the same amount of valve lift L1 for the same duration of D1. In other examples, the two valves may be operated with a different timing by adjusting the phasing, lift or duration based on engine conditions.

Now turning to the exhaust valves, the timing of the first exhaust valve and the second exhaust valve is staggered relative to one another. Specifically, the first exhaust valve is opened from a closed position at a first timing (curve 308) that is earlier in the engine cycle than the timing (curve 310) at which the second exhaust valve is opened from close. Specifically, the first timing for opening the first exhaust valve is between TDC and BDC of the power stroke, before CAD1 (e.g., before exhaust stroke BDC) while the timing for opening the second exhaust valve is just after exhaust stroke BDC, after CAD1 but before CAD2. The first exhaust valve (curve 308) is closed before the end of the exhaust stroke and the second exhaust valve (curve 310) is closed after the end of the exhaust stroke. Thus, the second exhaust valve remains open to overlap slightly with opening of the intake valves.

To elaborate, the first exhaust valve may be fully opened from close before the start of an exhaust stroke (e.g., between 90 and 40 degrees before BDC), maintained fully open through a first part of the exhaust stroke and may be fully closed before the exhaust stroke ends (e.g., between 50 and 0 degrees before TDC) to collect the blowdown portion of the exhaust pulse. The second exhaust valve (curve 310) may be fully opened from a closed position just after the beginning of the exhaust stroke (e.g., between 40 and 90 degrees past BDC), maintained open through a second portion of the exhaust stroke and may be fully closed after the intake stroke begins (e.g., between 20 and 70 degrees after TDC) to exhaust the scavenging portion of the exhaust. Additionally, the second exhaust valve and the intake valves, as shown in FIG. 3, may have a positive overlap phase (e.g., from between 20 degrees before TDC and 40 degrees after TDC until between 40 and 90 degrees past TDC) to allow blowthrough with EGR. This cycle, wherein all four valves are operational, may repeat itself based on engine operating conditions.

Additionally, the first exhaust valve may be opened at a first timing with a first amount of valve lift L2 while the second exhaust valve may be opened with a second amount of valve lift L3 (curve 310), where L3 is smaller than L2. Further still, the first exhaust valve may be opened at the first timing for a duration D2 while the second exhaust valve may be opened for a duration D3, where D3 is smaller than D2. It will be appreciated that in alternate embodiments, the two exhaust valves may have the same amount of valve lift and/or same duration of opening while opening at differently phased timings.

In this way, by using staggered valve timings, engine efficiency and power can be increased by separating exhaust gases released at higher pressure (e.g., expanding blowdown exhaust gases in a cylinder) from residual exhaust gases at low pressure (e.g., exhaust gases that remain in the cylinder after blow-down) into the different passages. By conveying low pressure residual exhaust gases as EGR along with blowthrough air to the compressor inlet (via the EGR passage and second exhaust manifold), combustion chamber temperatures can be lowered, thereby reducing knock and spark retard from maximum torque. Further, since the exhaust gases at the end of the stroke are directed to either downstream of a turbine or upstream of a compressor which are both at lower pressures, exhaust pumping losses can be minimized to improve engine efficiency.

Thus, exhaust gases can be used more efficiently than simply directing all the exhaust gas of a cylinder through a single, common exhaust port to a turbocharger turbine. As such, several advantages may be achieved. For example, the average exhaust gas pressure supplied to the turbocharger can be increased by separating and directing the blowdown pulse into the turbine inlet to improve turbocharger output. Additionally, fuel economy may be improved because blowthrough air is not routed to the catalyst, being directed to the compressor inlet instead, and therefore, excess fuel may not be injected into the exhaust gases to maintain a stoichiometric ratio.

Exhaust gases that are recirculated to an engine intake through the scavenge manifold, flowing from the second exhaust gas valves during an exhaust stroke of a cylinder, as described above for FIG. 3, may comprise a mixture of fresh air, burnt gas (e.g., combusted exhaust gas), and pushback fuel (e.g., unburnt fuel). Estimation of an EGR dilution rate, e.g. a fraction of burnt gas in an air mass at the compressor inlet, arising from the recirculated exhaust gases, out of the combined exhaust gas, fresh blowthrough air, and pushback fuel, at the engine intake may be achieved based on engine operating conditions. For example, engine speed and load may affect a combustion rate and hence the amount of exhaust gas generated. An amount of scavenge gas (a mixture of fresh blowthrough air, bunt gas, and pushback fuel) recirculated from the scavenge manifold to the intake may be regulated by a timing of an exhaust cam coupled to the scavenge exhaust valves. Additionally, the fraction of burnt gas recirculated to the engine cylinders may vary with a temperature of the scavenge gas.

Thus, the two exhaust valves are opened and closed at staggered timing to efficiently utilize the exhaust gas. This staggered timing results in a long combined exhaust event that begins when the blowdown exhaust valve (the first exhaust valve described above) is opened and ends when the scavenge exhaust valve (the second exhaust valve) closes. While this exhaust timing configuration provides the advantages described above, during very light engine loads, such as during engine idle, the long combined exhaust event results in overlap with the intake valve opening, which may adversely impact fuel economy and/or engine stability at light loads.

One approach to mitigate degraded fuel economy and/or engine stability at light loads in a split exhaust engine system includes holding the scavenge wastegate open (e.g., valve 97) and advancing the exhaust cam (which would result in exhaust valve closing timing for both exhaust valves to be advanced) to eliminate intake valve overlap. While such an approach may benefit engine stability, the early exhaust valve opening (EVO) causes losses that degrade fuel economy. If the exhaust cam is instead retarded to improve EVO losses, the internal residuals in the cylinders increase, hurting combustion stability.

Thus, as described in more detail below, the check valve that is positioned in parallel with the EGR valve (e.g., check valve 192) may open during certain conditions to introduce fresh air to the scavenge manifold at intake valve opening. The filling of the scavenge manifold prevents excessive residual from being stored in the scavenge manifold and improves stability and minimizes EVO losses. With increased stability, the exhaust blowdown valve may be opened closer to BDC to minimize EVO losses.

FIG. 4 shows a method 400 for operating a split exhaust engine system, such as the engine system of FIG. 1A or FIG. 1B, that includes a check valve (e.g., valve 192) in parallel with an EGR valve (e.g., valve 54). Instructions for carrying out method 400 and the rest of the methods included herein may be executed by a controller based on instructions stored on a memory of the controller and in conjunction with signals received from sensors of the engine system, such as the sensors described above with reference to FIGS. 1A-2. The controller may employ engine actuators of the engine system to adjust engine operation, according to the methods described below.

At 402, method 400 includes determining engine operating conditions. The determined operating conditions may include, but are not limited to, engine speed, engine load and/or torque, current operating mode, engine temperature, and other operating parameters. At 404, method 400 includes determining if the engine is operating at idle (or other low load condition where engine load is below a lower threshold load, such as less than 20% of maximum rated load). If the engine is not operating at idle or other low load condition (e.g., if load is greater than the lower threshold load), method 400 proceeds to 406 to adjust actuators of the split exhaust engine system according to current engine speed and load and/or other parameters.

For example, the scavenge manifold bypass valve (SMBV, such as SMBV 97) and wastegate (such as wastegate 76) may be adjusted based on engine speed and load (e.g., the SMBV may be maintained closed until engine speed and load each reach respective higher thresholds). Cylinder valve timing (such as the opening and/or closing timing of each of the intake valves, blowdown exhaust valves, and scavenge exhaust valves) may be adjusted based on the current operating mode (which may be a function of engine speed and load). As one non-limiting example, during steady-state engine operation where engine speed and engine load are both in mid-range (e.g., engine speed is 2000 RPM and engine load is at 50% of maximum load), the cylinder valve timing may be set to the timing illustrated in FIG. 3, which may provide optimal fuel economy. The cylinder valve timing may be adjusted from the optimal timing based on a demanded EGR rate (e.g., if demanded EGR rate is relatively low, exhaust valve timing may be retarded). In another example, during high engine speed and load conditions where compressor flow is limited (e.g., due to compressor operating temperature and/or flow being at or near a maximum temperature or flow), exhaust valve timing may be retarded relative to the optimal timing and intake valve timing may be advanced relative to the optimal timing. EGR valve position (such as the position of EGR valve 54) may be adjusted based on demanded EGR rate (which may be a function of engine speed and load) and in some examples may be further adjusted based on exhaust valve timing. Further, in configurations where a check valve is positioned in a conduit that is coupled to the intake system downstream of the compressor (such as the configuration illustrated in FIG. 1B), a blocking valve (such as blocking valve 54) may be closed to prevent undesired flow of compressed intake air to the scavenge manifold. Additional details regarding cylinder valve timing and exhaust system valve position adjustments during non-idle conditions are presented below with respect to FIGS. 7A and 7B. Method 400 then returns.

Returning to 404, if it is determined that the engine is operating at idle or other low load condition, method 400 proceeds to 408 to close (or maintained closed) the wastegate coupled across the turbine (such as wastegate 76) and close (or maintain closed) the SMBV (such as SMBV 97) to direct all exhaust gas to the turbine. At 410, method 400 includes closing (or maintaining closed) the EGR valve (such as EGR valve 54). By closing the EGR valve, dilution of the intake air with exhaust residuals may be avoided, leading to increased combustion stability. Further, in configurations where the conduit housing the check valve is coupled to the intake system downstream of the compressor, the blocking valve may be opened.

Because the EGR valve is closed, and because the scavenge manifold bypass valve is closed, any exhaust gas that is expelled from the scavenge exhaust valves accumulates in the scavenge manifold. In particular, if the exhaust valve timing is advanced such that the blowdown exhaust valves (e.g., the first exhaust valves 8 of FIG. 1A) close early, while the piston is still moving upward, pressure builds in the cylinders and scavenge manifold. This pressure may be relieved by opening the scavenge manifold bypass valve, but such a configuration leads to exhaust valve losses stemming from the early closing timing. Retarding the exhaust valve timing may mitigate these valve losses, but may still result in excess exhaust residuals building in the system due to low pressure that exists in the scavenge manifold during valve overlap. For example, some exhaust gas may be released via the scavenge exhaust valves (e.g., second exhaust valves 6 of FIG. 1A), and during the low pressure conditions that occur during valve overlap, this exhaust gas may be pulled back into the cylinders, leading to an accumulation of exhaust residuals in the cylinders that may lower combustion stability.

However, due to the presence of the check valve in the exhaust system (e.g., check valve 192 or 192' in parallel with the EGR valve), a substantial amount of intake/fresh air is allowed to flow into the scavenge manifold when the scavenge exhaust valves overlap with the intake valves. This maintains the scavenge manifold at ambient pressure and prevents the build-up of exhaust residuals in the system.

Accordingly, at 412, method 400 includes retarding blowdown exhaust valve timing and scavenge exhaust valve timing. For example, a common exhaust cam may be adjusted to retard the closing timing of both the blowdown exhaust valves (first exhaust valves 8 of FIG. 1A) and the scavenge exhaust valves (second exhaust valves 6 of FIG. 1A). The timing may be retarded so that the blowdown exhaust valves close closer to TDC of respective exhaust strokes, which results in more of the exhaust gas from the cylinders being expelled to the blowdown manifold and also reduces losses associated with early exhaust valve closing. The scavenge exhaust valve timing may be retarded so that a relatively high duration of valve overlap is present, such as a valve overlap period of 70 degrees crank angle. At 414, method 400 includes admitting intake air to the scavenge manifold via the check valve during the valve overlap periods. For example, intake/fresh air from upstream of the compressor may be sucked into the scavenge manifold via the check valve, as the check valve is configured to open when compressor inlet pressure is greater than scavenge manifold pressure. Method 400 then returns.

FIG. 5 is a diagram 500 showing example plots of burned mass fraction (e.g., exhaust residuals) present in a given cylinder at start of combustion as a function of exhaust valve closing timing for a plurality of engine configurations during idle engine operation. Diagram 500 depicts exhaust valve closing (for the scavenge exhaust valve in configurations where multiple exhaust valves are present) in degrees crank angle after top dead center along the x-axis, and depicts exhaust products (burned mass percentage at combustion start, which includes EGR and residuals) along the y-axis. A first plot 502 shows burned mass fraction as a function of exhaust valve closing for a standard, non-split exhaust system configuration. The standard exhaust system configuration may include a single exhaust manifold coupled to each cylinder where each cylinder may have only one exhaust valve. The standard exhaust system configuration may further include a turbocharger turbine coupled to the exhaust manifold. During the idle operation where the data shown in FIG. 5 was collected, the wastegate of the turbine was held fully closed. As shown by plot 502, the burned mass fraction increases as the exhaust valve closing timing is retarded. Likewise, as shown by plot 504, in a split exhaust engine system that does not include a check valve, when the wastegate is held closed and the SMBV is opened, the burned mass fraction increases as the closing time of the scavenge exhaust valves is retarded. For both plots 502 and 504, the burned mass fraction may exceed stability limits (e.g., percentages of greater than 40%) at very retarded exhaust valve closing timings (such as 70 degrees ATDC and later).

Plots 506 and 508 show burned mass fractions for the split exhaust engine system of the disclosure, such as the system of FIG. 1A or FIG. 1B, where a check valve is positioned in parallel with the EGR valve. Plot 506 shows the burned mass fraction when the SMBV is held open and plot 508 shows the burned mass fraction when the SMBV is closed. In both examples, the burned mass fraction is lowered by virtue of the check valve. For example, the burned mass fraction may not exceed 35% for any of the exhaust valve closings depicted in FIG. 5. As appreciated by plot 508, the burned mass fraction is considerably lower when the SMBV is closed. For example, the burned mass fraction may peak at a scavenge exhaust valve closing (SC-EVC) timing of 50 degrees ATDC, and then decrease as the SC-EVC is retarded beyond 50 degrees. At approximately 74 degrees CA ATDC, the burned mass fraction may be as low as the burned mass fraction at an SC-EVC timing of TDC (e.g., 14%). In contrast, at an EVC/SC-EVC of 74 degrees, when the SMBV is open, the burned mass fraction may be 33% (shown by plot 506); when no check valve is present and the SMBV is open, the burned mass fraction may be 47% (shown by plot 504).

Figure 6:
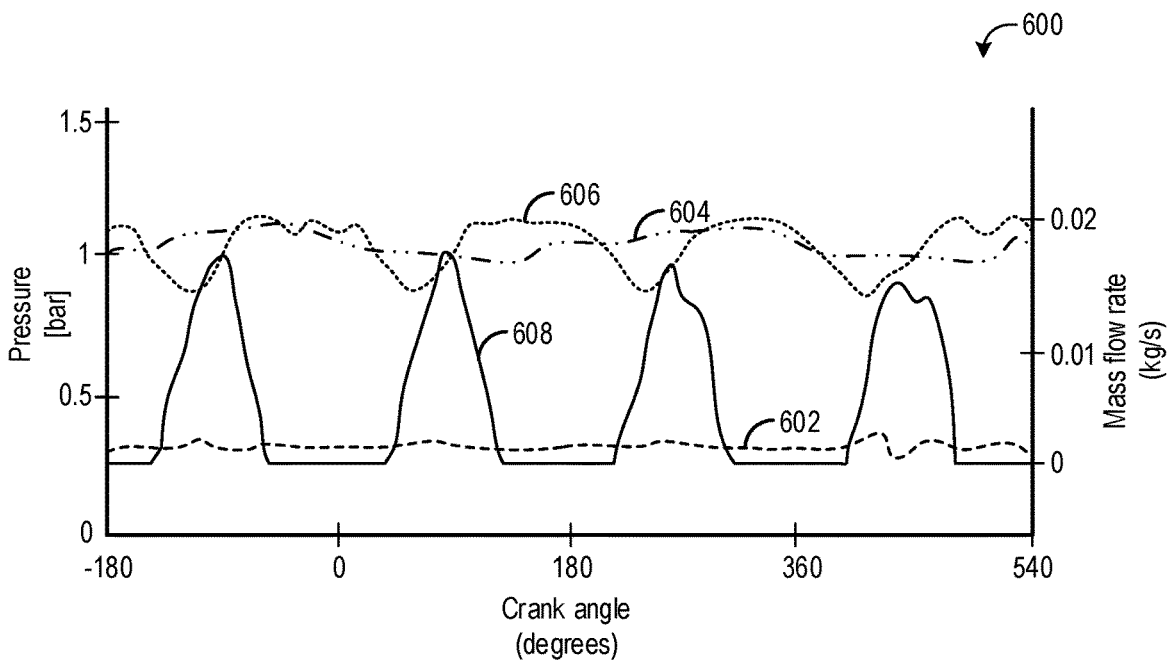
FIG. 6 is an example diagram showing check valve flow rate and manifold pressures over an engine cycle.
Figure 7A:
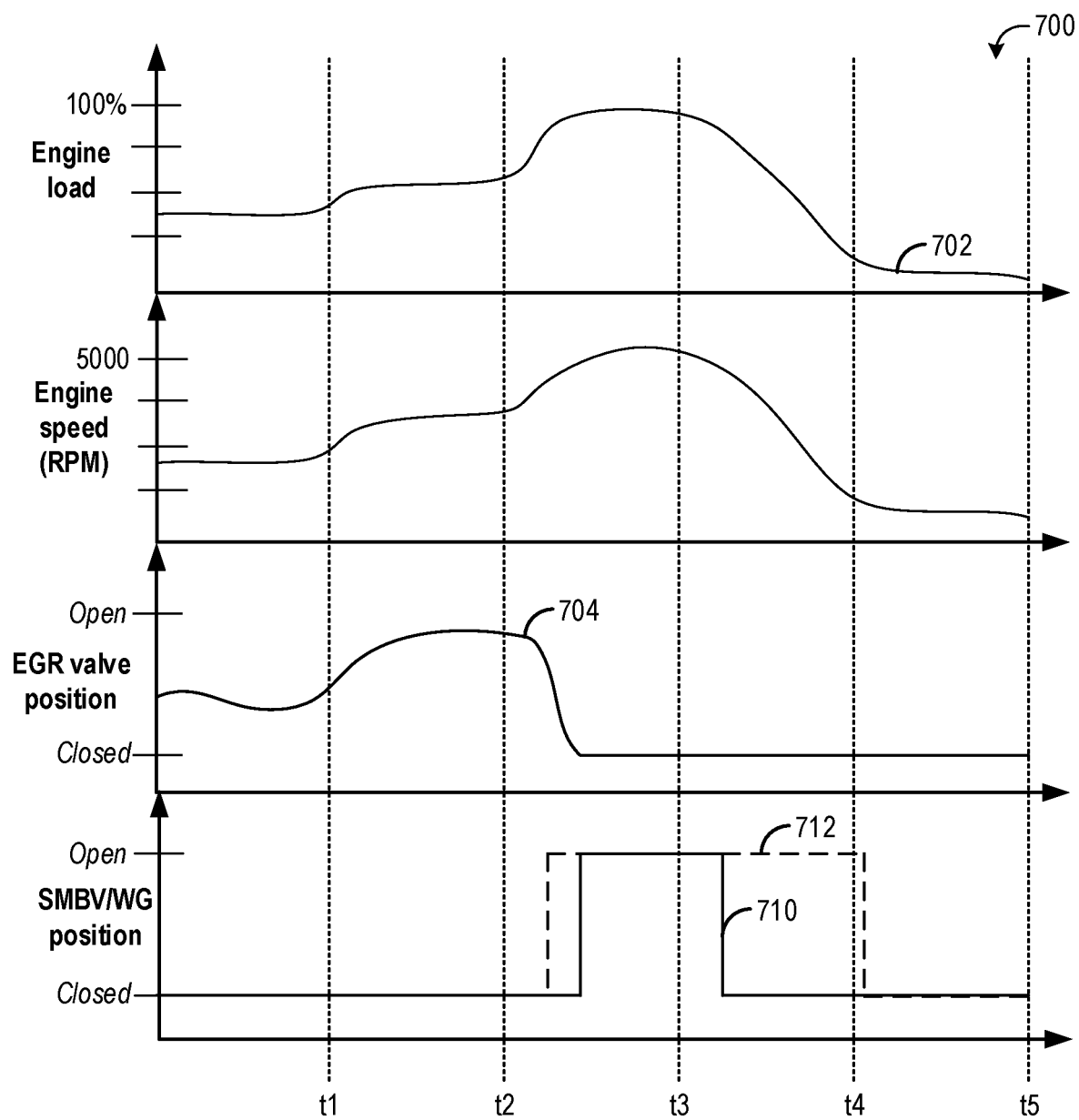
FIGS. 7A and 7B show an example timing diagram of operating parameters that may be observed during the execution of the method of FIG. 4.
Figure 7B:
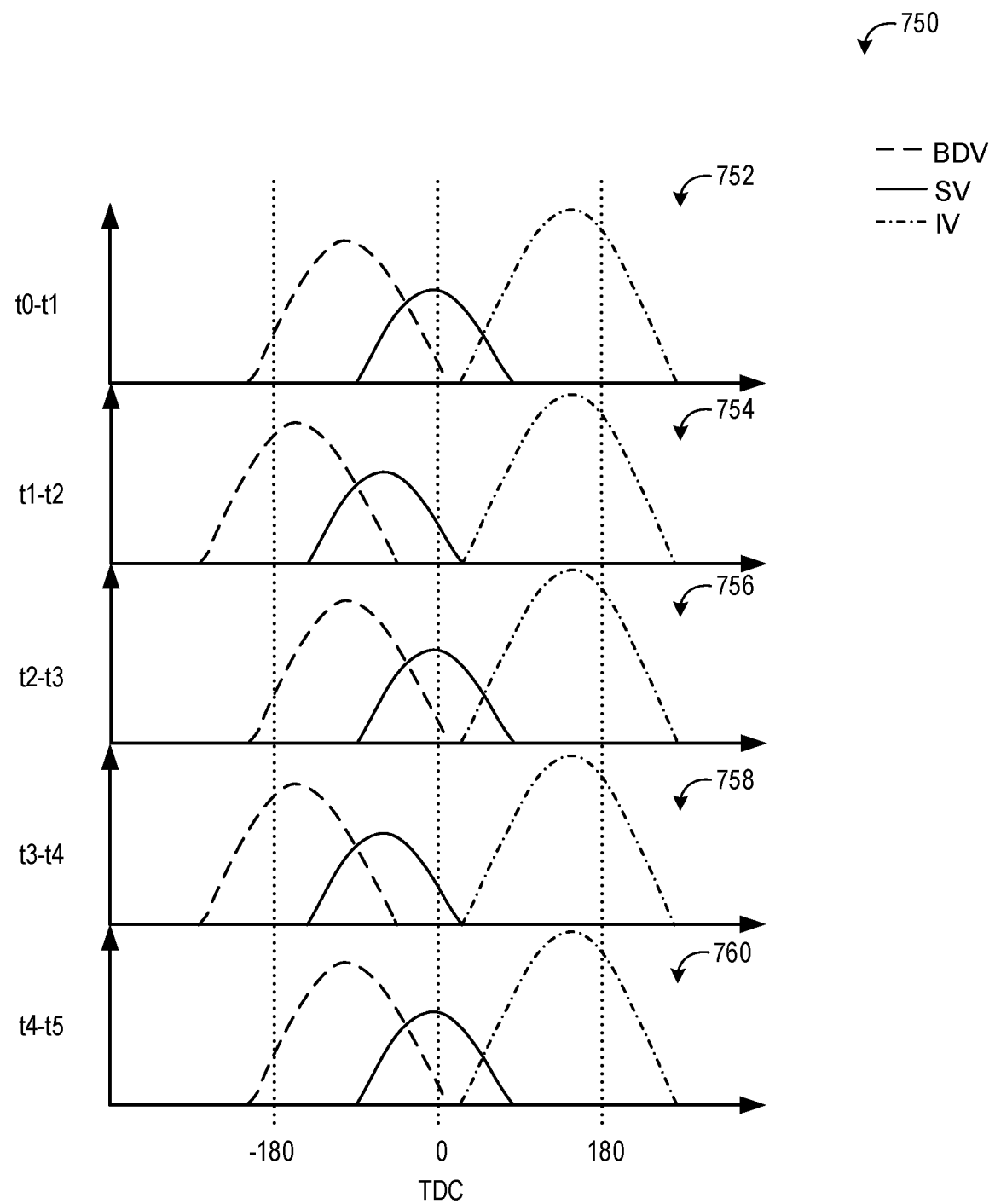

FIG. 6 is a diagram 600 showing mass flow and exhaust pressure as a function of engine position over a single engine cycle during idle operation, for a split exhaust engine system having a check valve, as described above with respect to FIG. 1A or FIG. 1B, with the SMBV closed. Diagram 600 depicts engine position in crank angle degrees along the x-axis and depicts mass flow rate (in kg/s) along a first y-axis (on the right side of FIG. 6) and pressure (in bar) along a second y-axis (on the left side of FIG. 6). The depicted engine cycle may include, for a given cylinder, a compression stroke between −180 and 0° CA, a power stroke between 0 and 180° CA, an exhaust stroke between 180 and 360° CA, and an intake stroke between 360 and 540° CA. The piston of the given cylinder may be at BDC at −180° CA, at TDC at 0° CA, at BDC at 180° CA, at TDC at 360° CA, and at BDC at 540° CA.

A first plot 602 illustrates intake pressure (e.g., intake manifold pressure), which is relatively steady and remains below ambient pressure during the depicted engine cycle. A second plot 604 illustrates exhaust pressure in the blowdown exhaust manifold, which is also relatively steady over the course of the engine cycle. The blowdown exhaust manifold is coupled to each cylinder via respective blowdown exhaust valves and receives exhaust gas each time a blowdown exhaust valve is open. The blowdown exhaust manifold then directs the exhaust gas to the turbine. The blowdown manifold is maintained around ambient pressure over the course of the engine cycle. A third plot 606 illustrates exhaust pressure in the scavenge manifold, which exhibits larger changes in pressure than the blowdown manifold. The scavenge manifold may decrease in pressure (e.g., below ambient pressure) during each valve overlap period, followed by a rise in pressure. For example, FIG. 6 illustrates intake pressure, exhaust pressure, and check valve mass flow over the course of an engine cycle where each cylinder, including a first cylinder, undergoes a combustion event. The first cylinder undergoes combustion starting around 0° CA may have a valve overlap period that begins around 360° CA, and as a result, the pressure of the scavenge manifold may decrease at 360° CA and increase once the overlap period is over (e.g., around 430° CA).

A fourth plot 608 shows mass flow through the check valve (e.g., mass flow rate of intake/fresh air pulled into the scavenge manifold via the check valve 192 or 192'). As appreciated from plot 608, the mass flow rate through the check valve pulses each time an overlap period occurs, which is a result of the decreases in scavenge manifold pressure. For the overlap period of the first cylinder, which occurs between 360 and 430° CA, the mass flow rate through the check valve increases from zero to a peak of approximately 0.015 kg/s. The mass flow through the check valve may be proportional to the amount of valve overlap, e.g., as the duration (e.g., crank angle degrees) of the overlap period increases, the mass flow through the check valve may increase. Following the overlap period (once the scavenge exhaust valve for the cylinder closes), the flow rate through the check valve decreases back to zero. A similar pulse occurs each time another cylinder has an overlap period. The engine configuration described herein includes four cylinders, thus four flow pulses are observed.

FIGS. 7A and 7B are timing diagrams showing example operating parameters that may be observed during the execution of method 400 of FIG. 4, for example. FIG. 7A depicts engine load, EGR valve position, and SMBV/wastegate position over time, incremented into five periods of interest. FIG. 7B shows example cylinder valve timings during each period of interest. FIGS. 7A and 7B will be described collectively.

Timing diagram 700 of FIG. 7A includes a first plot from the top showing engine load, a second plot from the top showing engine speed, a third plot from the top showing EGR valve position (which includes the position of the EGR valve 54 coupling the scavenge manifold to the intake passage upstream of the compressor), and a fourth plot from the top showing SMBV and turbine wastegate valve positions. Engine load is depicted in relative terms, with a minimum value of 0%, increasing to 100% along the y-axis. Times of interest are depicted along the x-axis.

Timing diagram 750 of FIG. 7B includes a first plot 752 from the top showing exhaust valve timing for a first exhaust valve (a blowdown exhaust valve, BDV), a second exhaust valve (a scavenge exhaust valve, SV), and an intake valve (IV) for a cylinder during the operation between times t0-t1 of FIG. 7A. A second plot 754 shows exhaust valve and intake valve timing for the cylinder during the operation between times t1-t2 of FIG. 7A. A third plot 756 shows exhaust valve and intake valve timing for the cylinder during the operation between times t2-t3 of FIG. 7A. A fourth plot 758 shows exhaust valve and intake valve timing for the cylinder during the operation between times t3-t4 of FIG. 7A. A fifth plot 760 shows exhaust valve and intake valve timing for the cylinder during the operation between times t4-t5 of FIG. 7A.

Prior to time t1, the engine is operating in a first low load mode where engine load is in a first load range (e.g., 25-50% of maximum load), as shown by curve 702. Engine speed is also be relatively low (such as below 2500 RPM), as shown by curve 703. In some examples, the engine may be operating with boost, such that intake manifold pressure is greater than compressor inlet pressure. During the first low load mode, the EGR valve is partially open, as shown by curve 704. Both the turbine wastegate and the SMBV are fully closed, as shown by curves 710 (for the turbine wastegate) and 712 (for the SMBV).

During operation in the first low load mode (e.g., during at least some time points between t0 and t1), the cylinder valve timing may be adjusted/controlled to a relatively retarded timing configuration. As shown by plot 752 of FIG. 7B, the blowdown exhaust valve may begin to open just before −180° CA and the scavenge exhaust valve may begin to open as the blowdown exhaust valve reaches peak lift (around −90° CA). The blowdown exhaust valve may close at 0° CA and the scavenge exhaust valve may close around 70° CA. The intake valves may open just after TDC (around 20° CA or so), resulting in a relatively long valve overlap period (e.g., 50° CA).

Around time t1, engine load increases to a second load range (e.g., 50-75% of maximum load) and engine speed is stable and moderate (e.g., 2000-3000 RPM). The wastegate and SMBV may remain closed. The EGR valve may remain open and the EGR rate may be adjusted by adjusting the EGR valve position (as shown, the degree of opening of the EGR valve may be increased) and/or by adjusting the exhaust and/or intake valve timing.

During operation in the steady EGR mode (e.g., during at least some time points between t1 and t2), the cylinder valve timing may be adjusted/controlled to a relatively advanced timing configuration. As shown by plot 754 of FIG. 7B, the blowdown exhaust valve may begin to open well before −180° CA and the scavenge exhaust valve may begin to open as the blowdown exhaust valve reaches peak lift (around −160° CA). The blowdown exhaust valve may close before 0° CA and the scavenge exhaust valve may close just after 0° CA. The intake valves may open just after TDC (around 20° CA or so), resulting in a relatively short valve overlap period. By advancing the valve timing, a relatively high amount of EGR may flow to the intake, e.g., due to a lower amount of blowthrough as a result of the small valve overlap period. If a decrease in EGR is desired or if increased blowthrough is desired (e.g., if compressor inlet temperature is high, the engine is knocking, etc.), the exhaust valve timing may be retarded and/or the intake valve timing may be advanced to increase the valve overlap period.

Starting at time t2, engine load again increases to a third load range (e.g., 75-100% of maximum rated load). As engine speed is also high (e.g., 4000-5000 RPM), exhaust flow may be sufficiently high to exceed the limits of the turbocharger and engine dilution tolerance. As a result, the SMBV opens to direct exhaust gas in the scavenge manifold to atmosphere (after passing through the emission control devices) and the wastegate opens to reduce the exhaust flow through the turbine. The SMBV may open before the turbine wastegate is opened, e.g., as engine speed increases. The EGR valve may also close. As shown by plot 756 of FIG. 7B, during at least some time points between t2 and t3, the exhaust valve timing may be returned to the retarded timing, similar to plot 752 described above.

At time t3, a tip-out may occur (e.g., as the operator of the vehicle begins to slow and then eventually stop the vehicle), resulting in a drop in engine load and engine speed. The wastegate may close in order to direct all exhaust gas from the blowdown manifold to the turbine. The SMBV may remain open and the EGR valve may remain closed to prevent exhaust gas from flowing to the engine. As shown by plot 758 of FIG. 7B, during at least some time points between t3 and t4, the exhaust valve timing may be returned to the advanced timing, similar to plot 754 described above.

Engine load continues to drop, and around time t4, the engine load is in the low/idle range of loads (e.g., below 25% of maximum load). The EGR valve may remain closed, and the SMBV may be closed. The air entering the engine enters via overlap of the scavenge exhaust valves and the intake valves. As shown by plot 760 of FIG. 7B, during at least some time points between t4 and t5, the exhaust valve timing may be returned to the retarded timing, similar to plot 752 described above.

Thus, the systems and methods described herein provide for a secondary pathway (e.g., secondary to an EGR passage) coupling a scavenge manifold to an intake system that allows the scavenge manifold to remain oxygen-rich/EGR poor during idle or other low load conditions. The secondary pathway may couple to the scavenge manifold on a first end (e.g., via an EGR passage coupled to the scavenge manifold) and may couple to the intake system on a second end. The secondary pathway may couple to the intake system at a suitable position along an intake passage in the intake system where intake air is above ambient pressure, such as before or at a compressor inlet, at or after a compressor outlet, or other location upstream of an intake throttle. The secondary pathway is controlled via a one-way check valve that is configured to open to admit intake air to the scavenge manifold but block flow of exhaust gas from the scavenge manifold to the intake passage. In this way, vacuum in the scavenge manifold that may otherwise develop during valve overlap while operating at idle may be avoided by admitting intake air into the scavenge manifold during the valve overlap period via the check valve, thereby preventing or reducing dilution of exhaust gas in the scavenge manifold.

The technical effect of providing a check valve in parallel with an EGR valve and fluidly coupling a scavenge exhaust manifold to an intake passage upstream of a throttle is reducing dilution of the scavenge manifold during valve overlap periods at idle, thereby lowering combustion instability and allowing exhaust valve timing to be retarded, lowering losses associated with earlier valve timing.

An example provides a method including maintaining a scavenge exhaust manifold above a threshold pressure by introducing fresh air into the scavenge manifold during a valve overlap period, the scavenge manifold coupled to a cylinder of an engine and coupled to an intake passage of the engine. In a first example of the method, maintaining a scavenge exhaust manifold above a threshold pressure by introducing fresh air into the scavenge manifold during a valve overlap period comprises maintaining the scavenge exhaust manifold at ambient pressure. In a second example of the method, which optionally includes the first example, maintaining a scavenge exhaust manifold above a threshold pressure by introducing fresh air into the scavenge manifold during a valve overlap period comprises admitting the fresh air into the scavenge manifold during the valve overlap period via a check valve positioned in a conduit, the conduit fluidly coupled to the scavenge manifold at a first end and fluidly coupled to the intake passage at a second end, the conduit fluidly coupled to the intake passage at a location of the intake passage that is upstream of an intake throttle. In a third example of the method, which optionally includes one or both of the first and second examples, the cylinder is coupled to the scavenge manifold via a scavenge exhaust valve, and the valve overlap period includes a period of an engine cycle when both the scavenge exhaust valve and an intake valve of the cylinder are open. In a fourth example of the method, which optionally includes one or more or each of the first through third examples, the method further includes, during low engine load conditions, retarding exhaust valve closing timing for both a blowdown exhaust valve coupling the cylinder to a turbine and the scavenge exhaust valve. In a fifth example of the method, which optionally includes one or more or each of the first through fourth examples, the method further includes, during the low engine load conditions, closing an exhaust gas recirculation (EGR) valve positioned between the scavenge manifold and the intake upstream of the compressor, the check valve is coupled in parallel with the EGR valve. In a sixth example of the method, which optionally includes one or more or each of the first through fifth examples, the method further includes, during conditions where engine load is higher than the low engine load conditions, adjusting a position of the EGR valve based on a commanded EGR rate.

An example provides a system for an engine, including a first set of exhaust valves exclusively coupled to a first exhaust manifold, the first exhaust manifold coupled to an intake passage, upstream of a turbocharger compressor, via an exhaust gas recirculation (EGR) passage, the EGR passage including an EGR valve; a second set of exhaust valves exclusively coupled to a second exhaust manifold coupled to an exhaust passage, upstream of a turbocharger turbine disposed in the exhaust passage; a plurality of engine cylinders, each including one of the first set of exhaust valves and one of the second set of exhaust valves; and a check valve positioned in a conduit parallel with the EGR valve. In a first example of the system, the first set of exhaust valves open at a different timing than the second set of exhaust valves and there is a valve overlap period between the first set of exhaust valves and intake valves of the plurality of engine cylinders where the one exhaust valve and intake valves of each cylinder are both open while the second set of exhaust valves are closed. In a second example of the system, which optionally includes the first example, the check valve is positioned to suction in intake air from the intake passage upstream of the turbocharger compressor and direct the intake air to the first exhaust manifold during the valve overlap period when engine load is below a threshold load. In a third example of the system, which optionally includes one or both of the first and second examples, the system further includes a bypass passage coupled between the first exhaust manifold and the exhaust passage, downstream of the turbocharger turbine, and a scavenge wastegate valve positioned in the bypass passage. In a fourth example of the system, which optionally includes one or more or each of the first through third examples, the system further includes a controller configured to close the scavenge wastegate and the EGR valve when engine load is below the threshold load. In a fifth example of the system, which optionally includes one or more or each of the first through fourth examples, the controller is further configured to adjust a first closing timing of the first set of exhaust valves and a second closing timing of the second set of exhaust valves when engine load is below the threshold load.

Another example provides a method including, during low engine load conditions, retarding exhaust valve closing timing for both a blowdown exhaust valve coupling a cylinder of an engine to a turbine and a scavenge exhaust valve coupling the cylinder to an intake of the engine via a scavenge manifold; and reducing exhaust residuals in the cylinder by admitting intake air into the scavenge manifold during a valve overlap period. In a first example of the method, the valve overlap period includes a period of an engine cycle when both the scavenge exhaust valve and an intake valve of the cylinder are open. In a second example of the method, which optionally includes the first example, admitting intake air into the scavenge manifold comprises admitting intake air to the scavenge manifold via a check valve positioned between the scavenge manifold and the intake upstream of a compressor. In a third example of the method, which optionally includes one or both of the first and second examples, the method further includes, during the low engine load conditions, closing an exhaust gas recirculation (EGR) valve positioned between the scavenge manifold and the intake upstream of the compressor, and the check valve coupled in parallel with the EGR valve. In a fourth example of the method, which optionally includes one or more or each of the first through third examples, the low engine load conditions comprise engine operation with engine load below a first threshold load, and further comprising during EGR enabled operation with engine load above the first threshold load, opening the EGR valve to flow exhaust gas from the scavenge manifold to the intake upstream of the compressor. In a fifth example of the system, which optionally includes one or more or each of the first through fourth examples, retarding exhaust valve closing timing for both the blowdown exhaust valve and the scavenge exhaust valve comprises closing the blowdown exhaust valve at a first timing and closing the scavenge exhaust valve at a second timing, later than the first timing, and further comprising during the EGR enabled operation, when commanded EGR is greater than a threshold EGR rate, closing the blowdown exhaust valve at a third timing and closing the scavenge exhaust valve at a fourth timing, where the third timing is earlier than the first timing and the fourth timing is earlier than second timing. In a sixth example of the method, which optionally includes one or more or each of the first through fifth examples, the method further includes, during the low engine load conditions, closing a scavenge wastegate coupling the scavenge manifold to an exhaust of the engine downstream of the turbine and closing a turbine wastegate coupled across the turbine.

Another representation provides a method, including during a first condition, adjusting a position of an exhaust gas recirculation (EGR) valve based on a commanded EGR rate, flowing gases from a first set of exhaust valves to an intake passage, and flowing combusted exhaust gases from a second set of exhaust valves to a turbine disposed in an exhaust passage and not to the intake passage, where each cylinder of a plurality of engine cylinders includes one valve of the first set of exhaust valves and one valve of the second set of exhaust valves. The method further includes, during a second condition, closing the EGR valve, flowing intake air from the intake passage to the plurality of engine cylinders via a check valve positioned in parallel with the EGR valve and via the first set of exhaust valves, and flowing combusted exhaust gases from the second set of exhaust valves to the turbine and not to the intake passage. In a first example of the method, the first condition comprises engine load in a first load range and the second condition comprises engine load in a second load range, the second load range lower than the first load range. In a second example of the method, which optionally includes the first example, the method further includes during the first condition, closing the first set of exhaust valves at a first timing, and during the second condition, closing the first set of exhaust valves at a second timing that is later than the first timing. In a third example of the method, which optionally includes one or both of the first and second examples, the method further includes during both the first condition and the second condition, opening a set of intake valves at a third timing that is earlier than the second timing, where each cylinder includes at least one intake valve of the set of intake valves. In a fourth example of the method, which optionally includes one or more or each of the first through third examples, the method further includes, during the first condition, adjusting a closing timing of the first set of exhaust valves based on the commanded EGR rate. In a fifth example of the method, which optionally includes one or more or each of the first through fourth examples, the method further includes, during the first condition, adjusting a position of a scavenge manifold bypass valve fluidly coupling the first set of exhaust valves to the exhaust passage downstream of the turbine based on exhaust gas mass flow, and during the second condition, closing the scavenge manifold bypass valve.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   maintaining a scavenge exhaust manifold above a threshold pressure by introducing fresh air into the scavenge exhaust manifold during a valve overlap period, the scavenge exhaust manifold coupled to a cylinder of an engine and coupled to an intake passage of the engine, wherein maintaining the scavenge exhaust manifold above the threshold pressure by introducing the fresh air into the scavenge exhaust manifold during the valve overlap period comprises admitting the fresh air into the scavenge exhaust manifold during the valve overlap period via a check valve positioned in a conduit, the conduit fluidly coupled to the scavenge exhaust manifold at a first end and fluidly coupled to the intake passage at a second end, and the conduit fluidly coupled to the intake passage at a location of the intake passage that is upstream of an intake throttle, and further comprising, during low engine load conditions, retarding exhaust valve closing timing for both a blowdown exhaust valve coupling the cylinder to a turbine and a scavenge exhaust valve.

2. The method of claim 1, wherein maintaining the scavenge exhaust manifold above the threshold pressure by introducing the fresh air into the scavenge exhaust manifold during the valve overlap period comprises maintaining the scavenge exhaust manifold at ambient pressure.

3. The method of claim 1, wherein the cylinder is coupled to the scavenge exhaust manifold via a scavenge exhaust valve, and wherein the valve overlap period includes a period of an engine cycle when both the scavenge exhaust valve and an intake valve of the cylinder are open.

4. The method of claim 1, further comprising, during the low engine load conditions, closing an exhaust gas recirculation (EGR) valve positioned between the scavenge exhaust manifold and the intake passage upstream of a compressor, and wherein the check valve is coupled in parallel with the EGR valve.

5. The method of claim 4, further comprising, during conditions where engine load is higher than the low engine load conditions, adjusting a position of the EGR valve based on a commanded EGR rate.

6. A method, comprising:
during low engine load conditions, retarding exhaust valve closing timing for both a blowdown exhaust valve coupling a cylinder of an engine to a turbine and a scavenge exhaust valve coupling the cylinder to an intake passage of the engine via a scavenge manifold; and
reducing exhaust residuals in the cylinder by admitting intake air into the scavenge manifold during a valve overlap period, wherein admitting the intake air into the scavenge manifold comprises admitting the intake air to the scavenge manifold via a check valve positioned between the scavenge manifold and the intake passage upstream of a compressor.

7. The method of claim 6, wherein the valve overlap period includes a period of an engine cycle when both the scavenge exhaust valve and an intake valve of the cylinder are open.

8. The method of claim 6, further comprising, during the low engine load conditions, closing an exhaust gas recirculation (EGR) valve positioned between the scavenge manifold and the intake passage upstream of the compressor, and wherein the check valve is coupled in parallel with the EGR valve.

9. The method of claim 8, wherein the low engine load conditions comprise engine operation with an engine load below a first threshold load, and further comprising, during EGR enabled operation with engine load above the first threshold load, opening the EGR valve to flow exhaust gas from the scavenge manifold to the intake passage upstream of the compressor.

10. The method of claim 9, wherein retarding the exhaust valve closing timing for both the blowdown exhaust valve and the scavenge exhaust valve comprises closing the blowdown exhaust valve at a first timing and closing the scavenge exhaust valve at a second timing, later than the first timing, and further comprising, during the EGR enabled operation, when commanded EGR is greater than a threshold EGR rate, closing the blowdown exhaust valve at a third timing and closing the scavenge exhaust valve at a fourth timing, where the third timing is earlier than the first timing and the fourth timing is earlier than second timing.

11. A method, comprising:
during low engine load conditions, retarding exhaust valve closing timing for both a blowdown exhaust valve coupling a cylinder of an engine to a turbine and a scavenge exhaust valve coupling the cylinder to an intake of the engine via a scavenge manifold;
reducing exhaust residuals in the cylinder by admitting intake air into the scavenge manifold during a valve overlap period; and
during the low engine load conditions, closing a scavenge wastegate coupling the scavenge manifold to an exhaust of the engine downstream of the turbine and closing a turbine wastegate coupled across the turbine.

* * * * *